(12) United States Patent
Sugae et al.

(10) Patent No.: US 11,579,277 B2
(45) Date of Patent: Feb. 14, 2023

(54) POSITION DETECTION SYSTEM AND PROCESSING DEVICE

(71) Applicant: AISIN CORPORATION, Kariya (JP)

(72) Inventors: Ippei Sugae, Chita-gun (JP); Hisashi Inaba, Kariya (JP)

(73) Assignee: AISIN CORPORATION, Kariya (JP)

( * ) Notice: Subject to any disclaimer, the term of this patent is extended or adjusted under 35 U.S.C. 154(b) by 1067 days.

(21) Appl. No.: 16/248,310

(22) Filed: Jan. 15, 2019

(65) Prior Publication Data

US 2019/0219680 A1 Jul. 18, 2019

(30) Foreign Application Priority Data

Jan. 16, 2018 (JP) .............................. JP2018-005174
May 30, 2018 (JP) .............................. JP2018-103098
Nov. 28, 2018 (JP) .............................. JP2018-222849

(51) Int. Cl.
| | | |
|---|---|---|
| H04L 23/00 | (2006.01) | |
| G01S 11/16 | (2006.01) | |
| G01S 5/30 | (2006.01) | |
| G01S 13/74 | (2006.01) | |
| G01S 5/18 | (2006.01) | |

(52) U.S. Cl.
CPC .................. *G01S 11/16* (2013.01); *G01S 5/18* (2013.01); *G01S 5/30* (2013.01); *G01S 13/74* (2013.01)

(58) Field of Classification Search
CPC . G01S 11/16; G01S 5/30; G01S 13/74; G01S 5/18; G01S 15/74; G01S 15/86
USPC .................................. 375/377, 295, 316, 219
See application file for complete search history.

(56) References Cited

U.S. PATENT DOCUMENTS

| | | | |
|---|---|---|---|
| 6,327,219 B1 * | 12/2001 | Zhang ..................... | G01S 15/86 367/128 |
| 2005/0043882 A1 | 2/2005 | Takazawa | |
| 2005/0125115 A1 | 6/2005 | Hiwatashi et al. | |

(Continued)

FOREIGN PATENT DOCUMENTS

| | | |
|---|---|---|
| CN | 101403622 A | 4/2009 |
| JP | 60-24475 A | 2/1985 |
| JP | 2005-70983 A | 3/2005 |

(Continued)

OTHER PUBLICATIONS

Hiromichi Hashizume et al, "Phase Accordance Method—An Accurate Ultrasonic Positioning Method and Its Characteristics", The Journal of the Institute of Electronics, Information and Communication Engineers, 2008, 16 pgs., vol. J91-A, No. 4.

(Continued)

*Primary Examiner* — Phuong Phu
(74) *Attorney, Agent, or Firm* — Sughrue Mion, PLLC

(57) ABSTRACT

A position detection system includes: a first device that is separate from a moving object, and is provided such that a position of the first device can be specified; and a second device that is mounted on the moving object. One of the first and second devices includes a first signal transmission unit that transmits a first first-signal, the other of the first and second devices includes a first signal reception unit that receives the first first-signal, one of the first and second devices includes a second signal transmission unit that transmits a first second-signal, and the other of the first and second devices includes a second signal reception unit that receives the first second-signal.

18 Claims, 18 Drawing Sheets

(56) References Cited

U.S. PATENT DOCUMENTS

2008/0291784 A1 11/2008 Yamanaka et al.
2016/0291116 A1* 10/2016 Horie ...................... G01S 15/74

FOREIGN PATENT DOCUMENTS

| JP | 2005-173736 | A | 6/2005 |
| JP | 2006-220642 | A | 8/2006 |
| JP | 4205640 | B2 | 1/2009 |
| JP | 2010-188744 | A | 9/2010 |
| JP | 5305324 | B2 | 10/2013 |
| JP | 2017-32535 | A | 2/2017 |
| JP | 2017-204178 | A | 11/2017 |

OTHER PUBLICATIONS

Tetsuya Sato et al., "An Extension Method of Phase Accordance Method for Accurate Ultrasonic Localization of Moving Node", The Journal of the Institute of Electronics, Information and Communication Engineers, 2009, 13 pgs., vol. J92-A, No. 12.

* cited by examiner

POSITION DETECTION SYSTEM AND PROCESSING DEVICE

CROSS REFERENCE TO RELATED APPLICATIONS

This application is based on and claims priority under 35 U.S.C. § 119 to Japanese Patent Applications 2018-005174, 2018-103098 and 2018-222849, filed on Jan. 16, 2018, May 30, 2018 and Nov. 28, 2018, respectively, the entire contents of which are incorporated herein by reference.

TECHNICAL FIELD

Embodiments of the present disclosure relate to a position detection system and a processing device.

BACKGROUND DISCUSSION

In the related art, there is a technique of recognizing a position of a moving object with a positioning system using a satellite such as a global positioning system (GPS).

An example of the related art includes JP 2005-173736A.

In the technique, a function thereof cannot be sufficiently exhibited in an environment in which an error of positioning using a satellite is likely to become large, such as an indoor place or a valley of buildings.

Thus, a need exists for a position detection system and a processing device which are not susceptible to the drawback mentioned above.

SUMMARY

A position detection system as an example of an embodiment includes a first device that is separate from a moving object, and is provided such that a position of the first device is able to be specified; and a second device that is mounted on the moving object, in which one of the first device and the second device includes a first signal transmission unit that transmits a first first-signal including a trigger to start detection of a position of the moving object, in which the other of the first device and the second device includes a first signal reception unit that receives the first first-signal, in which one of the first device and the second device includes a second signal transmission unit that transmits a first second-signal which is different from the first first-signal in response to transmission and reception of the first first-signal in the first signal transmission unit and the first signal reception unit, in which the other of the first device and the second device includes a second signal reception unit that receives the first second-signal, and in which at least one of the first device and the second device includes a position detection unit that specifies a positional relationship between the first device and the second device based on transmission and reception results of the first second-signal in the second signal transmission unit and the second signal reception unit, and detects the position of the moving object based on the positional relationship.

A processing device as another example of an embodiment, which is separate from a moving object and is provided such that a position of the processing device is able to be specified, includes a transmission unit that performs a transmission process of transmitting a predetermined first signal including a trigger to start detection of a position of the moving object; a reception unit that receives a second signal which is different from the first signal and is transmitted from the moving object; and a position detection unit that performs a position detection process of specifying a positional relationship between the processing device and the moving object based on the second signal received by the reception unit in response to reception of the first signal transmitted from the transmission unit, and detecting the position of the moving object based on the positional relationship.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments will be described with reference to the drawings. Configurations of embodiments described below and operations and results (effects) caused by the configurations are only examples, and are not limited to contents described below.

First Embodiment

Figure 1:
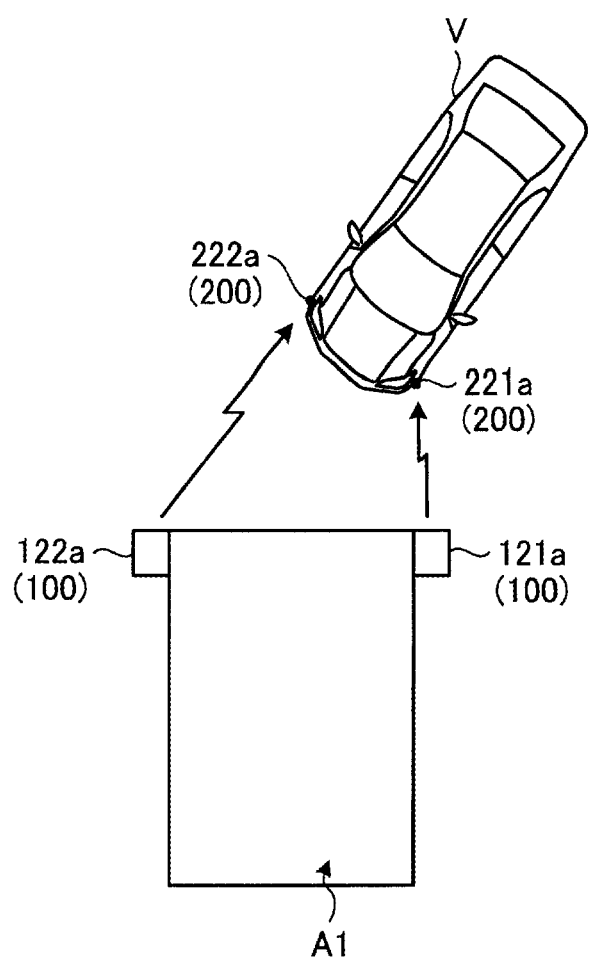
FIG. 1 is an exemplary and schematic diagram illustrating an application example of a position detection system according to a first embodiment.

FIG. 1 is an exemplary and schematic diagram illustrating an application example of a position detection system according to a first embodiment.

As illustrated in FIG. 1, a position detection system according to a first embodiment is applied to, for example, such a situation in which a vehicle V as a moving object is moved to the inside of an indoor region A1, and is parked and stopped therein, through automatic driving (semiautomatic driving). In this situation, it is important to recognize a position (current position) of the traveling vehicle V. The position of the vehicle V mentioned here is the concept also including a direction (azimuth) of the vehicle V.

Here, as a method for recognizing a position of the vehicle V, there is a general method using a positioning system using a satellite, such as a global positioning system (GPS) in the related art. However, in the technique, a function thereof cannot be sufficiently exhibited in an environment in which an error of positioning using a satellite is likely to become large, such as an indoor place or a valley of buildings, and thus the technique cannot be applied to the situation as illustrated in FIG. 1.

Therefore, in the first embodiment, a ground device 100 which is separate from the vehicle V and is stationarily provided at a predetermined position (for example, near the indoor region A1) of the indoor region A1 outside the vehicle V such that the position can be specified, an on-vehicle device 200 is provided in the vehicle V, and predetermined signals are transmitted and received between the ground device 100 and the on-vehicle device 200 such that a position of the vehicle V is recognized even in environment in which an error of positioning using a satellite is likely to become large. The ground device 100 is an example of a "first device", and the on-vehicle device 200 is an example of a "second device".

For example, in the example illustrated in FIG. 1, the ground device 100 is configured to output sonic waves (ultrasonic waves) via two transmitters 121a and 122a which are provided at different positions in a horizontal direction (a direction substantially parallel to a road surface), and the on-vehicle device 200 is configured to receive sonic waves which are respectively output from the transmitters 121a and 122a via two receivers 221a and 222a which are provided at different positions in the horizontal direction. Each of the transmitters 121a and 122a has a vibrator configured with a piezoelectric element or the like, and each of the receivers 221a and 222a also has a similar vibrator.

In the first embodiment, sonars for ranging, provided in the vehicle V, may also be used as the transmitters 121a and 122a, and dedicated speakers or microphones provided separately from the sonar may be used as the transmitters 121a and 122a. In a case where the sonars are also used as the transmitters 121a and 122a, the transmitters 121a and 122a may be all built into a single sonar, and may be respectively built into two sonars.

In the first embodiment, a position of the vehicle V is recognized based on transmission and reception results of predetermined signals using sonic waves.

Figure 2:
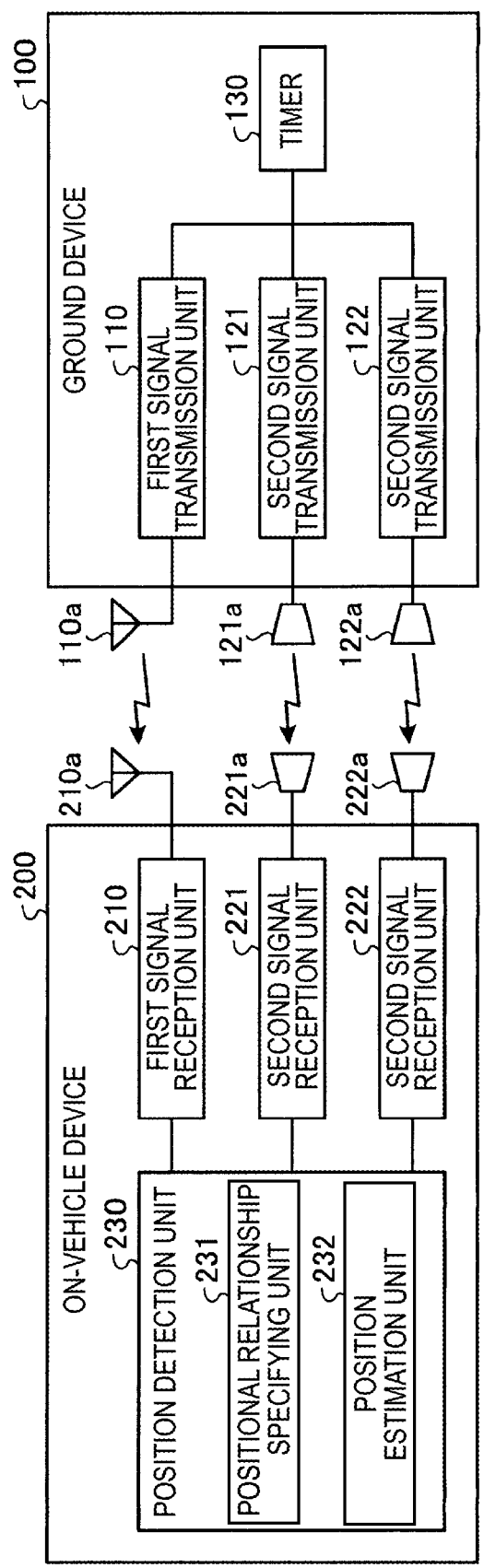
FIG. 2 is an exemplary and schematic block diagram illustrating functional configurations of a ground device and an on-vehicle device of the position detection system according to the first embodiment.

FIG. 2 is an exemplary and schematic diagram illustrating functional configurations of the ground device 100 and the on-vehicle device 200 of the position detection system according to the first embodiment.

As illustrated in FIG. 2, the ground device 100 includes a first signal transmission unit 110, second signal transmission units 121 and 122, and a timer 130. The on-vehicle device 200 includes a first signal reception unit 210, second signal reception units 221 and 222, and a position detection unit 230. A part or the whole of the functional module group illustrated in FIG. 2 may be realized through cooperation between hardware and software using a computer, and may be realized by only hardware such as a dedicated circuit.

The first signal transmission unit 110 transmits a predetermined signal (hereinafter, referred to as a first signal) via an antenna 110a by using an electromagnetic wave such as light. The second signal transmission units 121 and 122 transmit predetermined signals (hereinafter, referred to as second signals) via the transmitters 121a and 122a (refer to FIG. 1), respectively. The timer 130 counts up under a predetermined condition, and thus measures, for example, an elapsed time from transmission of the first signal and the second signal.

The first signal reception unit 210 receives the first signal transmitted from the first signal transmission unit 110 via an antenna 210a. The second signal reception units 221 and 222 receive the second signals transmitted from the second signal transmission units 121 and 122 via the receivers 221a and 222a, respectively. The position detection unit 230 detects (calculates, estimates, or acquires) a position of the vehicle V based on transmission and reception results of the second signals.

Here, in the first embodiment, the second signals are transmitted and received according to transmission and reception of the first signal. Therefore, the first signal functions as a synchronization signal for synchronization of transmission and reception timings of the second signals. Since a position of the vehicle V is detected by the position detection unit 230 based on transmission and reception results of the second signal as described above, the first signal can be said to function as a trigger to start to detect a position of the vehicle V.

Hereinafter, with reference to the drawing, a detailed description will be made of a method, performed by the position detection unit 230, of detecting a position of the vehicle V based on transmission and reception results of the second signals.

Figure 3:
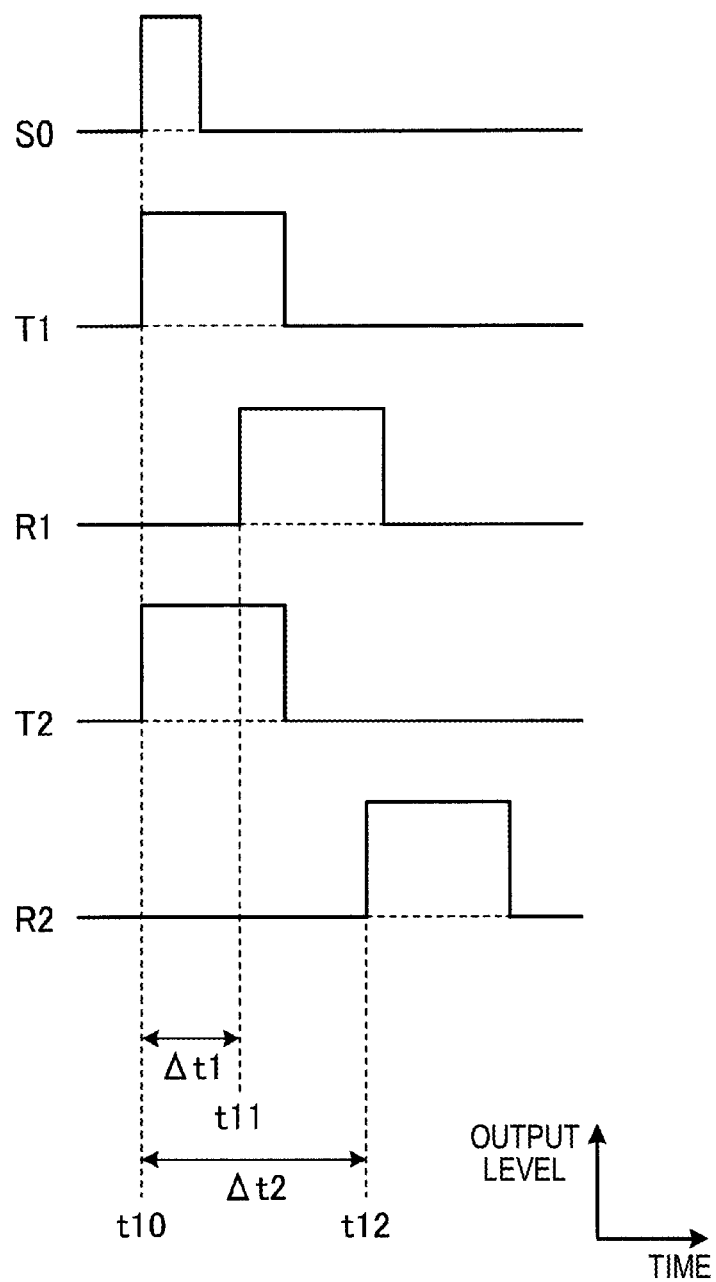
FIG. 3 is an exemplary and schematic diagram for explaining an example of a method of detecting a position of a vehicle in the position detection system according to the first embodiment.

FIG. 3 is an exemplary and schematic diagram for explaining an example of a method of detecting a position of the vehicle V in the position detection system according to the first embodiment.

In FIG. 3, S0 indicates a temporal change of an output level of the first signal transmitted from the first signal transmission unit 110. T1 indicates a temporal change of an output level of the second signal output from the second signal transmission unit 121, and R1 indicates a temporal change of an output level of the second signal received by the second signal reception unit 221. T2 indicates a temporal change of an output level of the second signal output from the second signal transmission unit 122, and R2 indicates a temporal change of an output level of the second signal received by the second signal reception unit 222. The waveforms of the first signal and the second signals illustrated in FIG. 3 are merely simplified as examples, and the first signal and the second signals may have various waveforms.

In the example illustrated in FIG. 3, there is a deviation corresponding to $\Delta t1$ between a timing t10 at which the second signal transmission unit 121 starts to transmit the second signal and a timing t11 at which the second signal reception unit 221 starts to receive the second signal from the second signal transmission unit 121. The time $\Delta t1$ corresponds to a time lag until the second signal as a sonic wave reaches the receiver 221a from the transmitter 121a. Therefore, a distance between the transmitter 121a and the receiver 221a can be calculated based on the time $\Delta t1$.

Similarly, in the example illustrated in FIG. 3, there is a deviation corresponding to $\Delta t2$ between the timing t10 at which the second signal transmission unit 122 starts to transmit the second signal and a timing t12 at which the second signal reception unit 222 starts to receive the second signal from the second signal transmission unit 122. The time $\Delta t2$ corresponds to a time lag until the second signal as a sonic wave reaches the receiver 222a from the transmitter 122a. Therefore, a distance between the transmitter 122a and the receiver 222a can be calculated based on the time $\Delta t2$.

As mentioned above, in the first embodiment, in a case where a deviation between transmission and reception timings of the second signals in the second signal transmission units 121 and 122 and the second signal reception units 221 and 222 are measured, an absolute positional relationship between the ground device 100 and the on-vehicle device 200, more specifically, a distance between the transmitter 121a and the receiver 221a and a distance between the transmitter 122a and the receivers 221a and 222a can be specified (calculated).

Here, positions (absolute positions) of the transmitters 121a and 122a are set to be invariable in advance. Positions of the receivers 221a and 222a on the vehicle V are also set to be invariable in advance. Therefore, an absolute position (and an absolute azimuth) of the vehicle V can be finally estimated by taking into consideration a position of each element and positional relationships (a distance between the transmitter 121a and the receiver 221a and a distance between the transmitter 122a and the receivers 221a and 222a) specified according to the method.

As described above, the first signal functions as a synchronization signal for synchronization of transmission and reception timings of the second signal. Therefore, a deviation between transmission and reception timings of the second signal is measured with transmission and reception timings of the first signal as references. In the example illustrated in FIG. 3, for simplification, the timing t10 at which the first signal transmission unit 110 starts to transmit the first signal is used as a reference of the time $\Delta t1$ and the time $\Delta t2$, but, actually, a timing at which the first signal reception unit 210 receives the first signal from the first signal transmission unit 110 may be used as a reference of the time $\Delta t1$ and the time $\Delta t2$.

However, as described above, the first signal is a signal transmitted and received by using an electromagnetic wave such as light, and the second signal is a signal transmitted and received by using a sonic wave of which a propagation speed is sufficiently lower than that of light. Therefore, a deviation between the timing t10 at which the first signal transmission unit 110 starts to transmit the first signal and a timing at which the first signal reception unit 210 starts to receive the first signal from the first signal transmission unit 110 is sufficiently smaller than the time $\Delta t1$ and the time $\Delta t2$, and is negligible.

Figure 4:
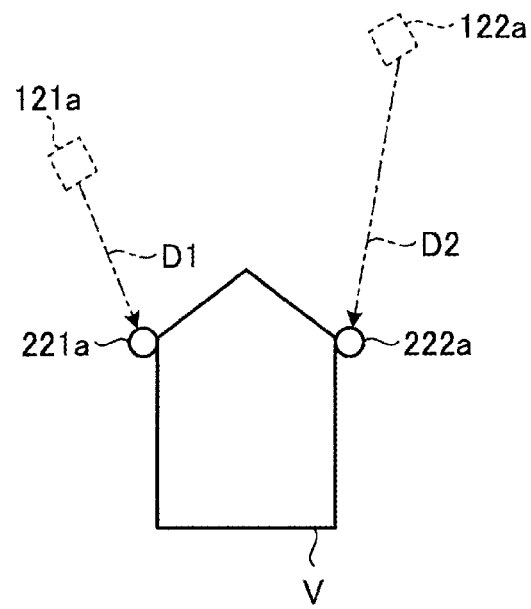
FIG. 4 is an exemplary and schematic diagram for explaining another example of a method of detecting a position of the vehicle in the position detection system according to the first embodiment.

FIG. 4 is an exemplary and schematic diagram for explaining another example of a method of detecting a position of the vehicle V in the position detection system according to the first embodiment.

In the method illustrated in FIG. 4, an absolute position (and an absolute azimuth) of the vehicle V is estimated based on a reception azimuth (a direction D1) of the second signal from the transmitter 121a, received by the receiver 221a, and a reception azimuth (a direction D2) of the second signal from the transmitter 122a, received by the receiver 222a.

Here, as described above, positions (absolute positions) of the transmitters 121a and 122a are set to be invariable in advance, and positions of the receivers 221a and 222a on the vehicle V are also set to be invariable in advance. Therefore, by taking into consideration a position of each element and the two reception azimuths, an absolute positional relationship between the ground device 100 (the transmitters 121a and 122a) and the on-vehicle device 200 (the receivers 221a and 222a) can be specified according to the same method as triangulation, and an absolute position (and an absolute azimuth) of the vehicle V can be finally estimated.

As mentioned above, in the first embodiment, the position detection unit 230 of the on-vehicle device 200 includes a positional relationship specifying unit 231 (refer to FIG. 2) which specifies a positional relationship between the ground device 100 and the on-vehicle device 200 based on either of the two methods, and a position estimation unit 232 (refer to FIG. 2) which estimates a position (including an azimuth) of the vehicle V based on the positional relationship specified by the positional relationship specifying unit 231. An estimation result in the position estimation unit 232 may be used to correct an estimation result based on a method (so-called odometry) of estimating the current position of the vehicle V by using a measurement value from a car wheel speed sensor or the like. In the odometry, since, as a movement distance of the vehicle V increases, an error of an estimation result becomes cumulatively large, the technique of the first embodiment is effective to solve such a cumulative error.

Next, with reference to FIGS. 5 and 6, a description will be made of an example of a process performed by the position detection system according to the first embodiment.

Figure 5:
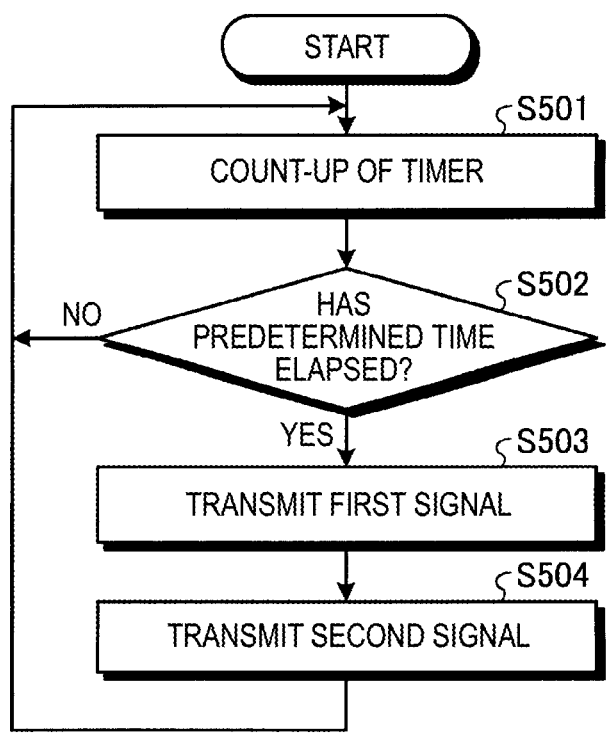
FIG. 5 is an exemplary and schematic flowchart illustrating a process performed by the ground device of the position detection system according to the first embodiment.

FIG. 5 is an exemplary and schematic flowchart illustrating a process performed by the ground device 100 of the position detection system according to the first embodiment.

In the process flow in FIG. 5, first, in S501, the ground device 100 performs count-up of the timer 130.

In S502, the ground device 100 determines whether or not a predetermined time has elapsed after the process in S501 is performed.

In S502, in a case where it is determined that the predetermined time has not elapsed after the process in S501 is performed, the process returns to S501. On the other hand, in S502, in a case where it is determined that the predetermined time has elapsed after the process in S501 is performed, the process proceeds to S503.

In S503, the ground device 100 causes the first signal transmission unit 110 to transmit the first signal using an electromagnetic wave such as light.

In S504, the ground device 100 causes the second signal transmission units 121 and 122 to transmit the second signals using sonic waves.

In a case where the process in S504 is completed, the process returns to S501. Therefore, in the process fluctuation in FIG. 5, the ground device 100 repeatedly transmits the first signal and the second signals every predetermined time.

Figure 6:
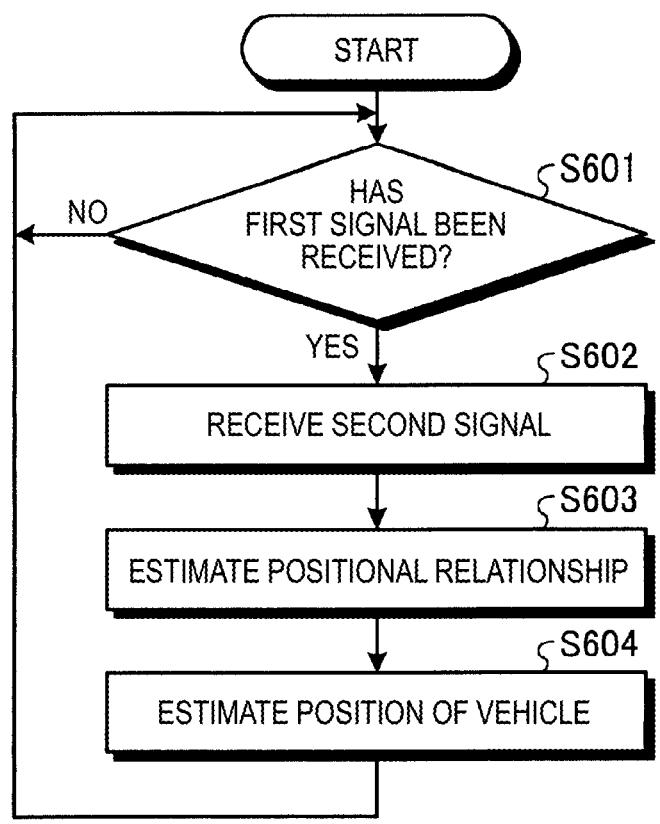
FIG. 6 is an exemplary and schematic flowchart illustrating a process performed by the on-vehicle device of the position detection system according to the first embodiment.

On the other hand, FIG. 6 is an exemplary and schematic flowchart illustrating a process performed by the on-vehicle device 200 of the position detection system according to the first embodiment. The process flow illustrated in FIG. 6 is executed, for example, in a case where the vehicle V comes close to the region A1 (refer to FIG. 1) in which the ground device 100 is provided.

In the process flow in FIG. 6, first, in S601, the on-vehicle device 200 determines whether or not the first signal transmitted from the ground device 100 (first signal transmission unit 110) in the above S503 has been received by the first signal reception unit 210.

The process in S601 is repeatedly executed until it is determined that the first signal has been received. In S601, in a case where it is determined that the first signal has been received, the process proceeds to S602.

In S602, the on-vehicle device 200 causes the second signal reception units 221 and 222 to receive the second signals transmitted from the ground device 100 (second signal transmission units 121 and 122) in the above S504.

In S603, the on-vehicle device 200 causes the positional relationship specifying unit 231 of the position detection unit 230 to specify a positional relationship between the ground device 100 and the on-vehicle device 200. A positional relationship between the ground device 100 and the on-vehicle device 200 may be specified by using either of the methods illustrated in FIGS. 3 and 4.

In S604, the on-vehicle device 200 causes the position estimation unit 232 of the position detection unit 230 to estimate a position (including an azimuth) of the vehicle V. The positional relationship estimated in S603 is taken into consideration in estimation of a position of the vehicle V.

In a case where the process in S604 is completed, the process returns to S601. The process flow in FIG. 6 is finished, for example, in a case where parking and stopping of the vehicle V in the region A1 (refer to FIG. 1) in which the ground device 100 is provided are completed.

As described above, the position detection system according to the first embodiment includes the ground device 100 provided at a predefined position in an indoor region (for example, the region A1 illustrated in FIG. 1) in which the vehicle V is movable, and the on-vehicle device 200 mounted on the vehicle V. The ground device 100 has the first signal transmission unit 110 which transmits the predetermined first signal including a trigger to detect a position of the vehicle V, and the on-vehicle device 200 includes the first signal reception unit 210 which receives the first signal. The ground device 100 includes the second signal transmission units 121 and 122 which transmit the second signals which are different from the first signal according to transmission and reception of the first signal in the first signal transmission unit 110 and the first signal reception unit 210, and the on-vehicle device 200 includes the second signal reception units 221 and 222 which receive the second signals. The second signal transmission units 121 and 122 are provided at different positions in the horizontal direction, and the second signal reception units 221 and 222 are provided at different positions in the horizontal direction. The on-vehicle device 200 includes the position detection unit 230 which specifies a positional relationship between the ground device 100 and the on-vehicle device 200 based on transmission and reception results of the second signals in the second signal transmission units 121 and 122 and the second signal reception units 221 and 222, and detects a position of the vehicle V based on the positional relationship.

According to the position detection system of the first embodiment, a positional relationship between the first device and the second device can be easily specified based on transmission and reception of the first signal and the second signal at two different positions in the horizontal direction without using a satellite, and thus it is possible to appropriately recognize a position of the vehicle V even in an environment in which an error of positioning using a satellite is likely to become large.

In the first embodiment, the position detection unit 230 can specify a positional relationship between the ground device 100 and the on-vehicle device 200 based on a difference between each of transmission timings of the two second signal transmitted from the second signal transmission units 121 and 122 and each of reception timings of the two second signals received by the second signal reception units 221 and 222. According to this configuration, a distance between the second signal transmission unit 121 and the second signal reception unit 221 and a distance between the second signal transmission unit 122 and the second signal reception unit 222 can be calculated based on differences between two sets of transmission timings and reception timings, and, as a result, a positional relationship between the ground device 100 and the on-vehicle device 200 can be easily specified.

In the first embodiment, the position detection unit 230 can specify a positional relationship between the ground device 100 and the on-vehicle device 200 based on reception azimuths of two second signals respectively received by the second signal reception units 221 and 222. According to this configuration, it is possible to easily specify a positional relationship between the ground device 100 and the on-vehicle device 200 according to the same method as triangulation based on two reception azimuths.

In the first embodiment, the first signal transmission unit 110 and the first signal reception unit 210 transmit and receive the first signal by using a first wave motion (for example, an electromagnetic wave such as light) which propagates at a first velocity, and the second signal transmission units 121 and 122 and the second signal reception units 221 and 222 transmit and receive the second signals by using second wave motions (for example, sonic waves) which propagate at a second velocity lower than the first velocity. According to this configuration, since a deviation between transmission and reception timings of the first signal is smaller than a deviation between transmission and reception timings of the second signal, the deviation between transmission and reception timings of the first signal can be prevented from influencing transmission and reception results of the second signals.

Second Embodiment

In the first embodiment, a configuration is exemplified in which the first signal including a trigger to detect a position of the vehicle V is transmitted from the ground device 100 to the on-vehicle device 200. However, there may be a configuration in which the first signal is transmitted from an on-vehicle device 1200 to a ground device 1100 as described below as a second embodiment.

Hereinafter, a position detection system according to the second embodiment will be described. Hereinafter, hereinafter, the same content between the first embodiment and the second embodiment will not be described.

Figure 7:
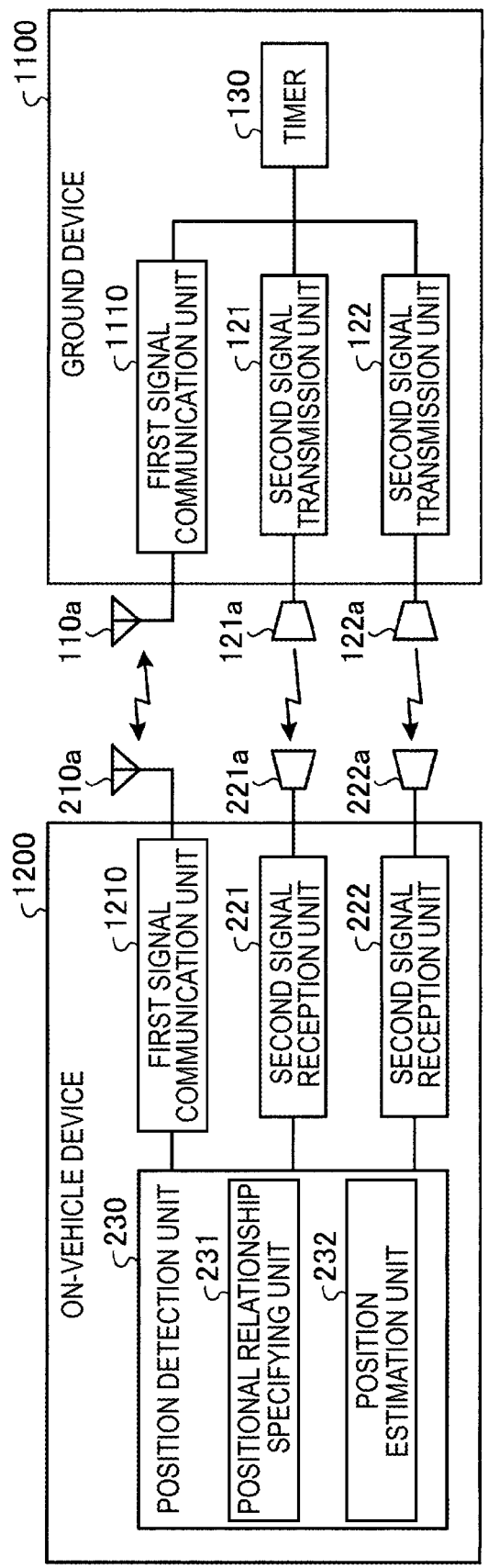
FIG. 7 is an exemplary and schematic block diagram illustrating functional configurations of a ground device and an on-vehicle device of a position detection system according to a second embodiment.

FIG. 7 is an exemplary and schematic block diagram illustrating functional configurations of the ground device 1100 and the on-vehicle device 1200 of the position detection system according to the second embodiment. The ground device 1100 is an example of a "first device", and the on-vehicle device 1200 is an example of a "second device".

As illustrated in FIG. 7, the ground device 1100 includes a first signal communication unit 1110, second signal transmission units 121 and 122, and a timer 130. The on-vehicle device 1200 includes a first signal communication unit 1210, second signal reception units 221 and 222, and a position detection unit 230. The second signal transmission units 121 and 122, the timer 130, the second signal reception units 221 and 222, and the position detection unit 230 are the same as those in the first embodiment (refer to FIG. 2).

The first signal communication unit 1110 of the ground device 1100 is configured to be able to perform both of transmission and reception of the first signal via the antenna 110a. Similarly, the first signal communication unit 1210 of the on-vehicle device 1200 is also configured to be able of perform both of transmission and reception of the first signal via the antenna 210a. Therefore, each of the first signal communication units 1110 and 1210 is an example of a "first signal transmission unit", and is also an example of a "first signal reception unit". According to this configuration, as will be described below, it is possible to realize a position detection system which performs transmission and reception of the first signal and the second signals only in a case where a position of the vehicle V is required to be detected, such as a case where the vehicle V comes close to the region A1 (refer to FIG. 1) in which the ground device 1100 is provided.

Figure 8:
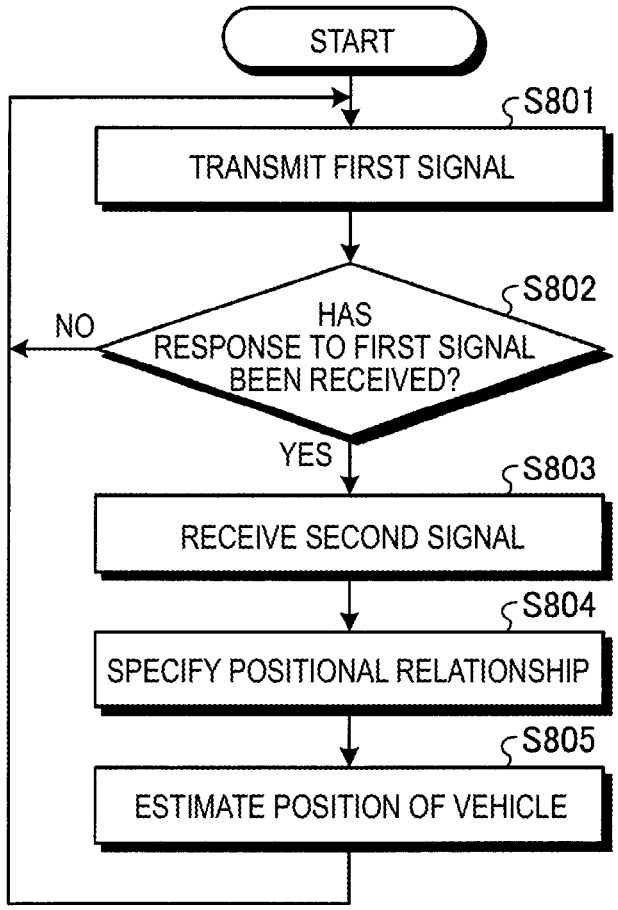
FIG. 8 is an exemplary and schematic flowchart illustrating a process performed by the on-vehicle device of the position detection system according to the second embodiment.

FIG. 8 is an exemplary and schematic flowchart illustrating a process performed by the on-vehicle device 1200 of the position detection system according to the second embodiment. The process flow illustrated in FIG. 8 is executed, for example, in a case where the vehicle V comes close to the region A1 (refer to FIG. 1) in which the ground device 1100 is provided.

In the process flow in FIG. 8, first, in S801, the on-vehicle device 1200 causes the first signal communication unit 1210 to transmit the first signal using an electromagnetic wave such as light.

In S802, the on-vehicle device 1200 determines whether or not a response to the first signal transmitted in S801, from the ground device 1100, has been received by the first signal communication unit 1210.

In S802, in a case where it is determined that the response to the first signal has not been received, the process returns to S801. On the other hand, in S802, in a case where it is determined that the response to the first signal has been received, the process proceeds to S803.

In S803, the on-vehicle device 1200 causes the second signal reception units 221 and 222 to receive the second signals transmitted from the ground device 1100.

In S804, the on-vehicle device 1200 causes the positional relationship specifying unit 231 of the position detection unit 230 to specify a positional relationship between the ground device 1100 and the on-vehicle device 1200. A positional relationship between the ground device 1100 and the on-vehicle device 1200 may be specified by using either of the methods illustrated in FIGS. 3 and 4.

In S805, the on-vehicle device 1200 causes the position estimation unit 232 of the position detection unit 230 to estimate a position (including an azimuth) of the vehicle V. The positional relationship estimated in S804 is taken into consideration in estimation of a position of the vehicle V.

In a case where the process in S805 is completed, the process returns to S801. The process flow in FIG. 8 is finished, for example, in a case where parking and stopping of the vehicle V in the region A1 (refer to FIG. 1) in which the ground device 1100 is provided are completed.

Figure 9:
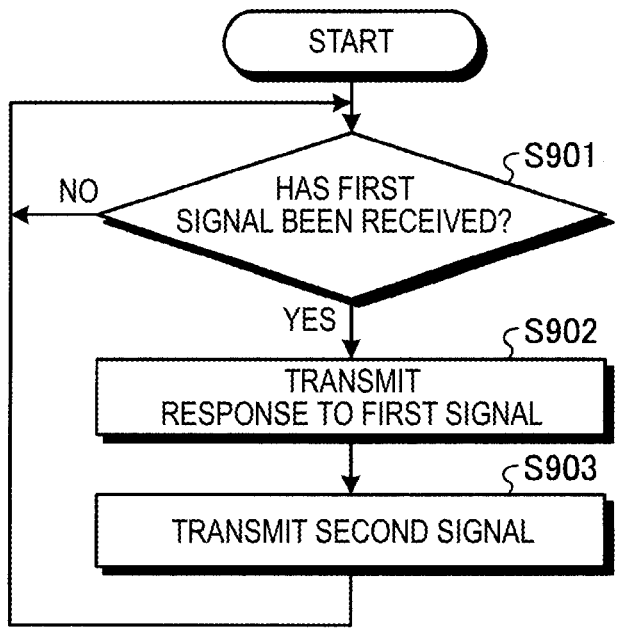
FIG. 9 is an exemplary and schematic flowchart illustrating a process performed by the ground device of the position detection system according to the second embodiment.

FIG. 9 is an exemplary and schematic flowchart illustrating a process performed by the ground device 1100 of the position detection system according to the second embodiment.

In the process flow in FIG. 9, first, in S901, the ground device 1100 determines whether or not the first signal transmitted from the on-vehicle device 1200 (first signal communication unit 1210) in the above S801 has been received by the first signal communication unit 1110.

The process in S901 is repeatedly executed until it is determined that the first signal has been received. In S901, in a case where it is determined that the first signal has been received, the process proceeds to S902.

In S902, the ground device 1100 causes the first signal communication unit 1110 to transmit a response to the first signal received in S901 by using an electromagnetic wave such as light.

In S903, the ground device 1100 causes the second signal transmission units 121 and 122 to transmit the second signals using sonic waves.

In a case where the process in S903 is completed, the process returns to S901. Thus, in the process flow in FIG. 9, after the process returns to S901 from S903, the ground device 1100 does not transmit the second signals in S903 until the first signal transmitted from the on-vehicle device 1200 is received again.

As mentioned above, in the second embodiment, the ground device 1100 transmits the second signals only in a case where there is a request from the on-vehicle device 1200. Therefore, according to the second embodiment, it is possible to perform transmission and reception of the second signals required to detect a position at an appropriate timing only in a case where a position of the vehicle V is required to be detected.

Modification Example of First Embodiment and Second Embodiment

In the first embodiment (and the second embodiment), the technique for detecting a position of the vehicle V as a moving object in an indoor place is exemplified. However, in addition to an indoor place, the technique is widely applicable to an environment in which an error of positioning using a satellite is likely to become large, such as a valley of buildings. The technique may also be used to detect a position of a moving object other than the vehicle V.

In the first embodiment (and the second embodiment), a description has been made of an exemplary configuration in which a position of the vehicle V provided with the on-vehicle device 200 is detected through transmission and reception of a signal between the ground device 100 (and 1100) and the on-vehicle device 200 (and 1200). However, as a modification example, there may be a configuration in which each vehicle detects a position thereof based on results of transmission and reception of a predetermined signal performed by vehicles having on-vehicle devices. In this configuration, each vehicle may acquire a position of a vehicle which is a communication partner by performing an image recognition process on an image captured by a camera and including the communication partner vehicle, or by receiving a position estimated by the communication partner vehicle according to a method such as odometry, through so-called inter-vehicle communication. Each vehicle detects a position thereof based on the position of the communication partner vehicle acquired in the above-described way and transmission and reception results of a predetermined signal between the vehicles.

In the first embodiment (and the second embodiment), a description has been made of an exemplary configuration in which the second signal transmission units 121 and 122 (transmitters 121*a* and 122*a*) are provided at different positions in the horizontal direction, and the second signal reception units 221 and 222 (receivers 221*a* and 222*a*) are also provided at different positions in the horizontal direction. However, as a modification example, the second signal transmission units and the second signal reception units may be provided at different positions in the vertical direction. In this configuration, an inclination (including an inclination of a road surface) in a pitch direction of a vehicle may be acquired as a position of a vehicle.

In the first embodiment, a description has been made of an exemplary configuration in which the ground device 100 as a first device has the first signal transmission unit 110, and the on-vehicle device 200 as a second device has the first signal reception unit 210. However, even in a configuration in which the first device has the first signal reception unit, and the second device has the first signal transmission unit, a result equivalent to that in the first embodiment may be obtained in a case where appropriate control is performed.

Similarly, in the first embodiment (and the second embodiment), a description has been made of an exemplary configuration in which the ground device 100 (and 1100) as a first device has the second signal transmission units 121 and 122, and the on-vehicle device 200 (and 1200) as a second device has the second signal reception units 221 and 222. However, even in a configuration in which the first device has the second signal reception units, and the second device has the second signal transmission units, a result equivalent to that in the first embodiment (and the second embodiment) may be obtained in a case where appropriate control is performed (for example, refer to a third embodiment which will be described later).

In the first embodiment (and the second embodiment), a description has been made of an exemplary configuration in which the on-vehicle device 200 (and 1200) as a second device has the position detection unit 230. However, even in a configuration in which the ground device 100 (and 1100) as a first device has the position detection unit, even in a configuration in which both of the first device and the second device have the position detection unit, a result equivalent to that in the first embodiment may be obtained in a case where appropriate control is performed (for example, refer to a third embodiment which will be described later).

In the first embodiment (and the second embodiment), a description has been made of an exemplary configuration in which the two second signal transmission units 121 and 122 (transmitters 121*a* and 122*a*) and the two second signal reception units 221 and 222 (receivers 221*a* and 222*a*) are provided. However, a condition in which either one of the methods illustrated in FIGS. 3 and 4 is that at least either of the second signal transmission units and the second signal reception units is provided by at least two. Therefore, even in a configuration in which the second signal transmission unit is provided by only one, and the second signal reception units are provided by two or more, even in a configuration in which the second signal transmission units are provided by two or more, and the second signal reception unit is provided by only one, even in a configuration in which both of the second signal transmission units and the second signal reception units are provided by three or more, a result equivalent to that in the first embodiment can be obtained.

However, estimation of a position of the vehicle V is realizable even in a case where neither of the methods illustrated in FIGS. 3 and 4 are used, that is, each of the second signal transmission unit and the second signal reception unit is provided by only one. For example, in a case where transmission and reception results of the second signal at a first timing, transmission and reception results of the second signal at a second timing which is different from the first timing, and a parameter indicating movement of the vehicle V estimated by the vehicle V based on detection results in various sensors (for example, a steering angle sensor or a car wheel speed sensor) in a period between the first timing and the second timing are used, a position of the vehicle V can be estimated even in a case where each of the second signal transmission unit and the second signal reception unit is provided by only one.

In the first embodiment (and the second embodiment), a description has been made of an exemplary configuration in which the first signal is transmitted and received by using an electromagnetic wave such as light, and the second signal is transmitted and received by using a sonic wave. However, in a case where a propagation velocity (first velocity) of a wave motion (first motion) for transmitting and receiving the first signal is higher than a propagation velocity (second velocity) of a wave motion (second motion) for the transmitting and receiving the second signal, a result equivalent to that in the first embodiment (and the second embodiment) can be obtained.

In the first embodiment (and the second embodiment), the supply of power to the ground device 100 (and 1100) is not particularly mentioned, but the supply of power to the ground device 100 (and 1100) may be realized by typical means such as a power supply wiring for connection to an external power source, and may be realized according to a technique as in the third embodiment which will be described later.

In the first embodiment (and the second embodiment), as a situation on which position detection is performed, a situation (refer to FIG. 1) has been exemplified in which a vehicle V as a moving object is moved to the inside of an indoor region A1, and is parked and stopped therein, through automatic driving (semiautomatic driving). However, position detection may be applied to a situation described below in addition to the situation illustrated in FIG. 1.

Figure 10:
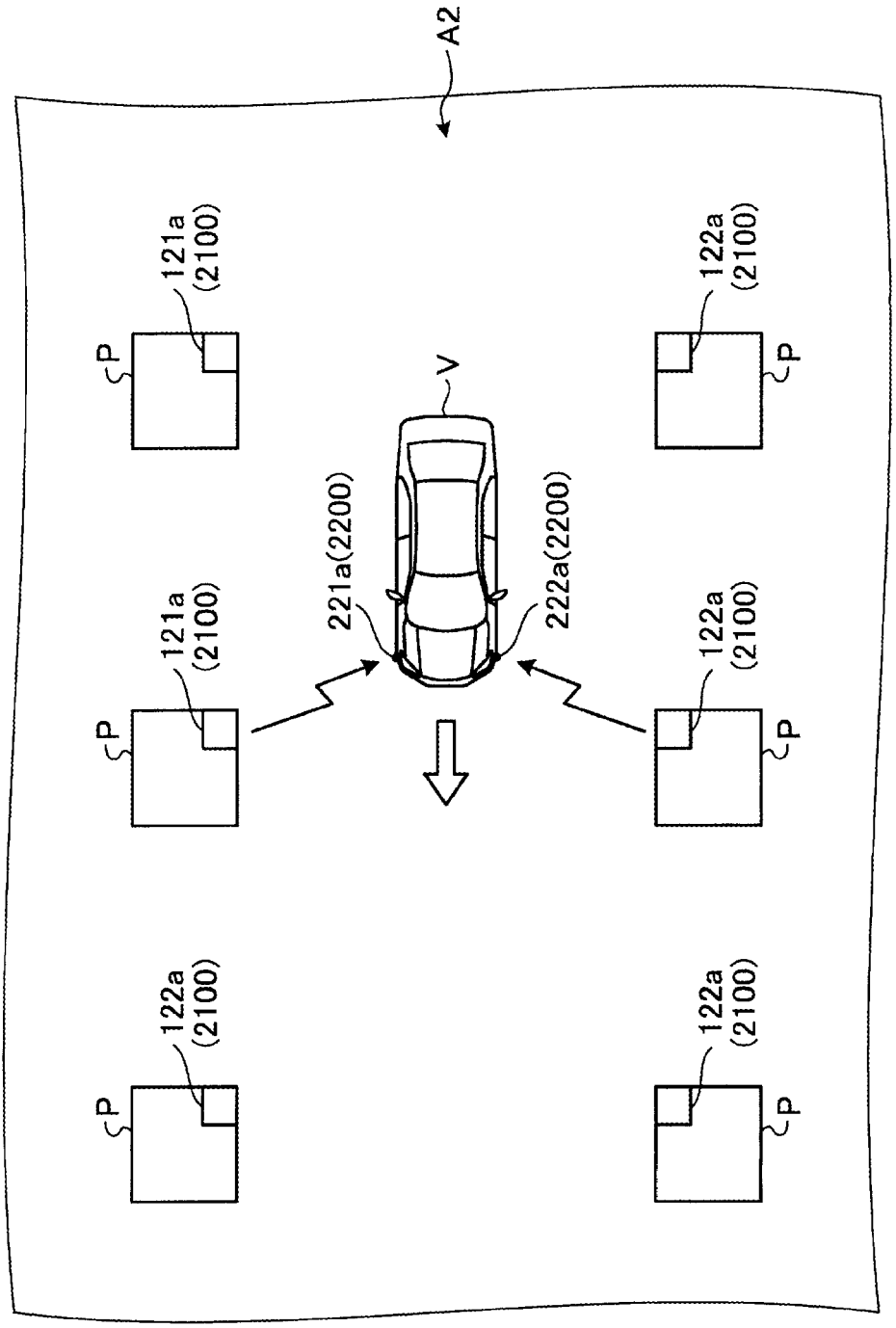
FIG. 10 is an exemplary and schematic diagram illustrating an application example of a position detection system according to a modification example of the first embodiment and the second embodiment.

FIG. 10 is an exemplary and schematic diagram illustrating an application example of a position detection system according to a modification example of the first embodiment and the second embodiment.

As illustrated in FIG. 10, a position detection system according to a modification example of the first embodiment and the second embodiment is applied to a situation in which the vehicle V is moved through automatic driving (semiautomatic driving) along a passage of an indoor region A2 in which a plurality of structures P such as pillars of which positions are not variable are provided, such as an indoor parking space of a shopping mall. Also in this situation, it is important to recognize a position (current position) of the traveling vehicle V.

In the example illustrated in FIG. 10, the second signals are transmitted and received between a ground device 2100 (transmitters 121a and 122a) provided at a predefined position of the structure P and an on-vehicle device 2200 (receivers 221a and 222a) provided on the vehicle V, and a position of the vehicle V is detected according to either of the methods illustrated in FIGS. 3 and 4 based on transmission and reception results of the second signals.

As illustrated in FIG. 10, in a configuration in which three or more sets of the transmitters 121a and 122a are provided, it is necessary for the on-vehicle device 2200 side to appropriately determine which set of transmitters 121a and 122a the second signal are transmitted from. Therefore, in the example illustrated in FIG. 10, encoding using phase modulation may be performed on the second signals such that identification information is assigned to the second signals.

Third Embodiment

In the configuration based on devices for position detection being provided on both of the ground side and the on-vehicle side, there may be some room for the supply of power to the device on the ground side. In other words, the supply of power to the device on the on-vehicle side is easily realizable by using a power source in the vehicle V, but the supply of power to the device on the ground side is not easily realizable unless any means causing a complex configuration is provided, such as a power supply wiring for connection to an external power source.

Therefore, in the third embodiment, the supply of power to the device on the ground side is easily realized (with a simple configuration) by using a configuration as described below.

Figure 11:
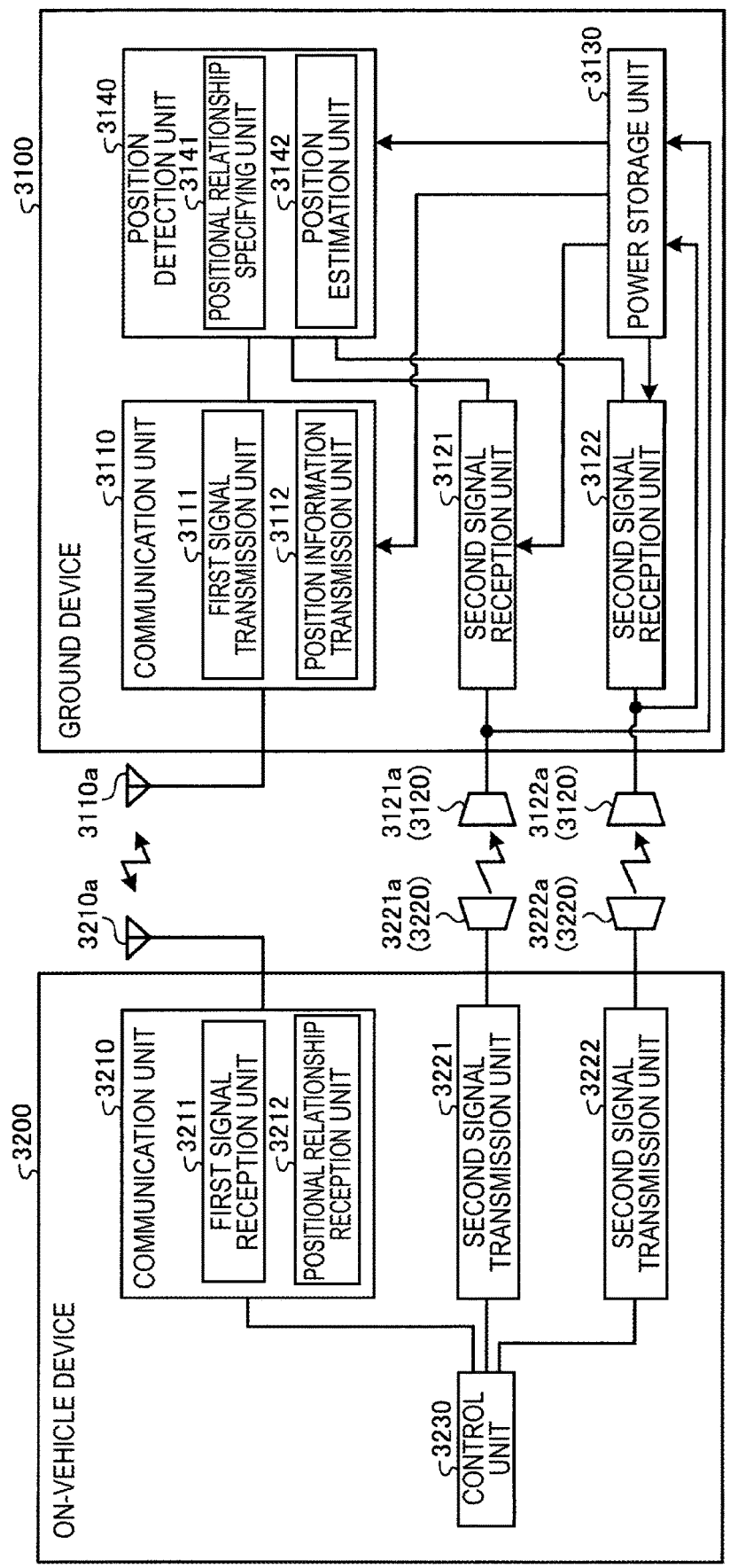
FIG. 11 is an exemplary and schematic block diagram illustrating functional configurations of a ground device and an on-vehicle device of a position detection system according to a third embodiment.

FIG. 11 is an exemplary and schematic block diagram illustrating functional configurations of a ground device 3100 and an on-vehicle device 3200 of a position detection system according to a third embodiment. In the third embodiment, the ground device 3100 has a function of specifying a position of the vehicle V. The ground device 3100 is an example of a "first device" and a "processing device", and the on-vehicle device 3200 is an example of a "second device".

As illustrated in FIG. 11, the ground device 3100 includes a communication unit 3110, two second signal reception units 3121 and 3122, a power storage unit 3130, and a position detection unit 3140. The second signal reception units 3121 and 3122 are an example of a "reception unit". The communication unit 3110 is an example of a "transmission unit", and is also an example of "processing unit", and the position detection unit 3140 is an example of a "processing unit". The communication unit 3110 includes a first signal transmission unit 3111 and a position information transmission unit 3112, and the position detection unit 3140 includes a positional relationship specifying unit 3141 and a position estimation unit 3142.

The first signal transmission unit 3111, the second signal reception units 3121 and 3122, the positional relationship specifying unit 3141, and the position estimation unit 3142 have the substantially same functions as those of the constituent elements having the same names in the first embodiment and the second embodiment.

More specifically, the first signal transmission unit 3111 transmits, for example, the first signal including a trigger to detect a position of the vehicle V via an antenna 3110a via which an electromagnetic wave such as light is transmitted and received. The second signal reception units 3121 and 3122 receive the second signals which are different from the first signal via receivers 3121a and 3122a which respectively receive sonic waves (ultrasonic waves). Each of the receivers 3121a and 3122a has, for example, a vibrator 3120 such as a piezoelectric element which vibrates according to reception of a sonic wave.

The positional relationship specifying unit 3141 specifies a (relative) positional relationship between the ground device 3100 and the vehicle V (on-vehicle device 3200) based on the second signals received by the second signal reception units 3121 and 3122 according to transmission of the first signal from the first signal transmission unit 3111. Needless to say, a method based on a difference between a transmission timing and a reception timing of the second signal or a method based on reception azimuths of the second signals is used to specify a positional relationship in the same manner as in the first embodiment and the second embodiment. The position estimation unit 3142 estimates (detects, calculates, or acquires) a position of the vehicle V (on-vehicle device 3200) based on a position (an absolute position stored in advance) of the ground device 3100 and the positional relationship specified by the positional relationship specifying unit 3141.

On the other hand, the on-vehicle device 3200 includes a communication unit 3210, two second signal transmission units 3221 and 3222, and a control unit 3230. The communication unit 3210 includes a first signal reception unit 3211 and a positional relationship reception unit 3212.

The first signal reception unit 3211 and the second signal transmission units 3221 and 3222 have the substantially same functions as those of the constituent elements having the same names in the first embodiment and the second embodiment. More specifically, the first signal reception unit 3211 receives, for example, the first signal via an antenna 3210a via which an electromagnetic wave such as light is transmitted and received. The second signal transmission units 3221 and 3222 transmit the second signals via transmitters 3221a and 3222a which respectively transmit sonic waves (ultrasonic waves). Each of the transmitters 3221a and 3222a has, for example, a vibrator 3220 such as a piezoelectric element which vibrates according to reception of a sonic wave in the same manner as the receivers 3121a and 3122a.

Here, the third embodiment is clearly different from the first embodiment and the second embodiment in terms of the power storage unit 3130 and the position information transmission unit 3112 provided in the ground device 3100 and the positional relationship reception unit 3212 and the control unit 3230 provided in the on-vehicle device 3200. Hereinafter, the constituent elements will be described more in detail.

The power storage unit 3130 stores electric power generated according to reception of the second signals in the second signal reception units 3121 and 3122. More specifically, the power storage unit 3130 stores electric power generated according to vibration of the vibrators 3120 of the receivers 3121a and 3122a. In other words, since reception of the second signals in the second signal reception units 3121 and 3122 is caused by vibration of the vibrators 3120 of the receivers 3121a and 3122a, the power storage unit 3130 converts mechanical energy caused by vibration of the vibrators 3120 into electrical energy, and stores the electrical energy as electric power.

The power storage unit 3130 supplies the stored electric power to each unit of the ground device 3100. Consequently, the ground device 3100 is operated based on the electric power stored in the power storage unit 3130. For example, the first signal transmission unit 3111 transmits the first signal based on the electric power stored in the power storage unit 3130, and the position detection unit 3140 detects a position of the vehicle V (on-vehicle device 3200) based on the electric power stored in the power storage unit 3130.

Here, in the third embodiment, a position of the vehicle V (on-vehicle device 3200) is detected by the ground device 3100. However, a position of the vehicle V is used to control traveling of the vehicle V such as automatic traveling, and is thus required to be transferred to the vehicle V side after detected by the ground device 3100.

Therefore, in the third embodiment, the position information transmission unit 3112 transmits a detection result in the position detection unit 3140 to the on-vehicle device 3200 via the antenna 3110a as position information indicating a position of the vehicle V.

In the third embodiment, the positional relationship reception unit 3212 receives the position information from the position information transmission unit 3112 via the antenna 3210a. The control unit 3230 notifies a traveling control unit (not illustrated) such as an electronic control unit (ECU) controlling traveling of the vehicle V of the position information received by the positional relationship reception unit 3212. Consequently, an accurate position of the vehicle V detected by the ground device 3100 can be reflected in traveling control for the vehicle V.

The control unit 3230 controls not only the communication unit 3210 including the positional relationship reception unit 3212 but also the second signal transmission units 3221 and 3222.

Meanwhile, the technique of the third embodiment is applicable to a situation in which a plurality of vehicles V may simultaneously travel in a parking space, such as automatic valet parking in which the vehicle V automatically travels in the parking space and is automatically parked in a predetermined parking region. In this situation, since the ground device 3100 provided at a predetermined position in the parking space may simultaneously receive the second signals from a plurality of vehicles V (on-vehicle devices 3200), as described in the modification example, there is a need for a technique capable of appropriately identifying the plurality of vehicles V on the ground device 3100 side.

Therefore, in the third embodiment, the second signal transmission units 3221 and 3222 transmit the second signals as sonic waves, as encoded signals to which identification information uniquely set for the vehicles V (on-vehicle devices 3200) is assigned, based on encoding using phase modulation, amplitude modulation, or frequency modulation. The position detection unit 3140 detects a position of the vehicle V (on-vehicle device 3200) corresponding to identification information based on the identification information which is obtained by decoding the encoded signals received by the second signal reception units 3121 and 3122. Consequently, even in a case where a situation occurs in which the ground device 3100 simultaneously receives the second signals from a plurality of vehicles V (on-vehicle devices 3200), the plurality of vehicles V (on-vehicle devices 3200) can be appropriately differentiated from each other, and positions thereof can be appropriately detected.

Next, with reference to FIGS. 12 and 13, a description will be made of an example of a process performed by the position detection system according to the third embodiment.

Figure 12:
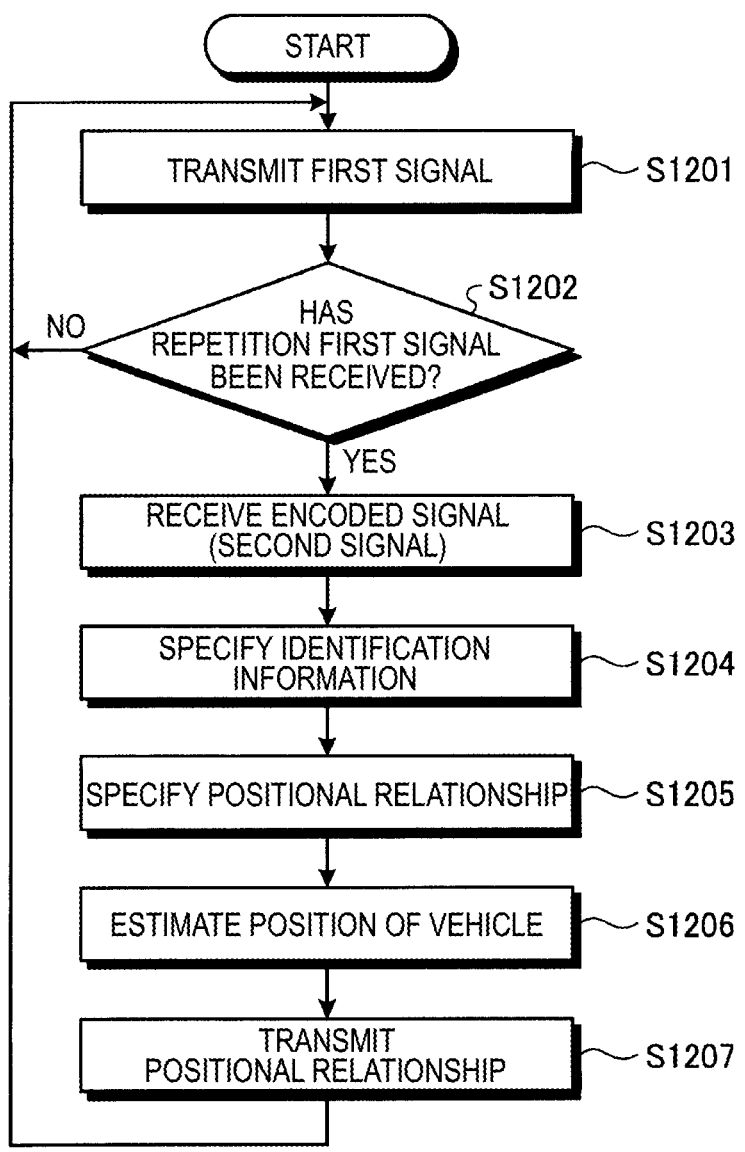
FIG. 12 is an exemplary and schematic flowchart illustrating a process performed by the ground device of the position detection system according to the third embodiment.

FIG. 12 is an exemplary and schematic flowchart illustrating a process performed by the ground device 3100 of the position detection system according to the third embodiment. The process flow in FIG. 12 is started in a case where the vibrators 3120 of the receivers 3121a and 3122a vibrate due to reception of the second signals from the on-vehicle device 3200, and, as a result, predetermined electric power is stored in the power storage unit 3130.

In the process flow in FIG. 12, first, in S1201, the ground device 3100 causes the first signal transmission unit 3111 of the communication unit 3110 to transmit the first signal using an electromagnetic wave such as light.

In S1202, the ground device 3100 determines whether or not a response to the first signal transmitted in S1201, from the on-vehicle device 3200, has been received by the communication unit 3110.

In S1202, in a case where it is determined that the response to the first signal has not been received, the process returns to S1201. On the other hand, in S1202, in a case where it is determined that the response to the first signal has been received, the process proceeds to S1203.

In S1203, the ground device 3100 causes the second signal reception units 3121 and 3122 to receive encoded signals as the second signals transmitted from the on-vehicle device 3200. As described above, the encoded signals transmitted from the on-vehicle device 3200 are assigned with identification information uniquely set for the on-vehicle device 3200.

In S1204, the ground device 3100 (for example, the position detection unit 3140) decodes the encoded signals received in S1203, and specifies the identification information assigned to the encoded signals.

In S1205, the ground device 3100 causes the positional relationship specifying unit 3141 of the position detection unit 3140 to specify a positional relationship between the on-vehicle device 3200 corresponding to the identification information specified in S1204 and the ground device 3100. A positional relationship is specified based on a difference between a transmission timing and a reception timing of the second signal (encoded signal), or according to the above-described method based on reception azimuths of the second signals (encoded signals).

In S1206, the ground device 3100 causes the position estimation unit 3142 of the position detection unit 3140 to estimate a position of the vehicle V on which the on-vehicle device 3200 corresponding to the identification information specified in S1204 is mounted, based on the positional relationship specified in S1205.

In S1207, the ground device 3100 causes the position information transmission unit 3112 of the communication unit 3110 to transmit position information as an estimation result in S1206. The process returns to S1201.

Figure 13:
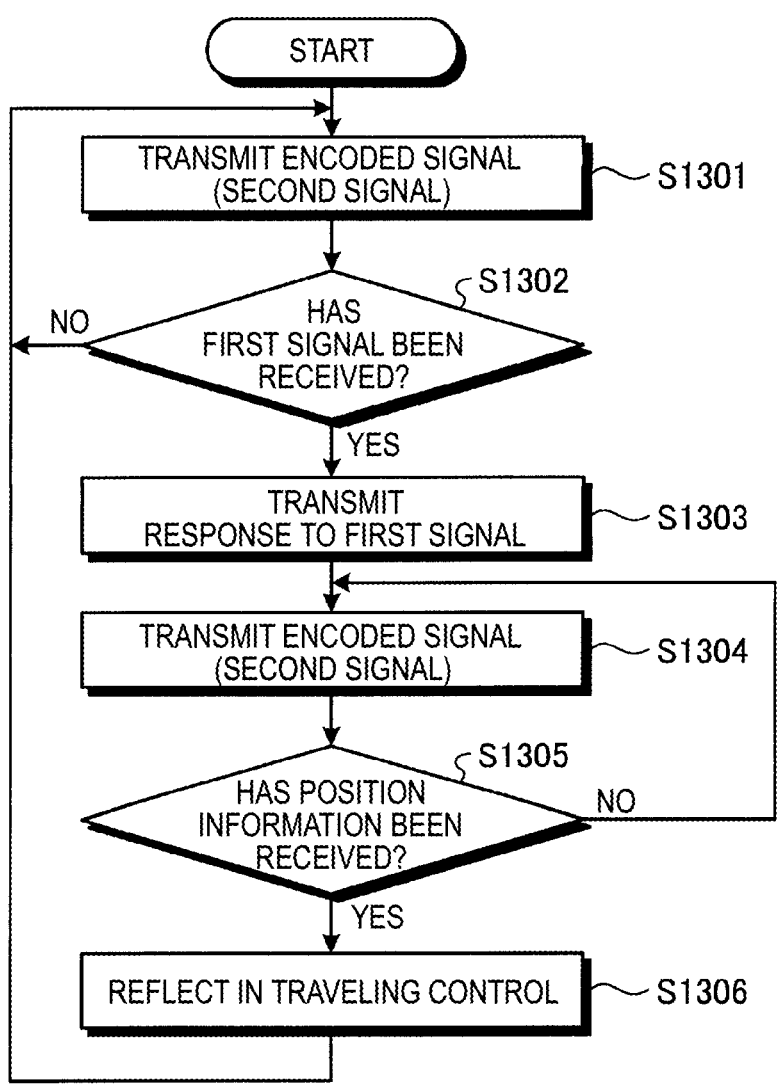
FIG. 13 is an exemplary and schematic flowchart illustrating a process performed by the on-vehicle device of the position detection system according to the third embodiment.

On the other hand, FIG. 13 is an exemplary and schematic flowchart illustrating a process performed by the on-vehicle device 3200 of the position detection system according to the third embodiment.

In the process flow illustrated in FIG. 13, first, in S1301, the on-vehicle device 3200 causes the second signal transmission units 3221 and 3222 to transmit encoded signals as the second signals.

In S1302, the on-vehicle device 3200 determines whether or not the first signal transmitted from the ground device 3100 in the above S1201 has been received by the first signal reception unit 3211 of the communication unit 3210.

In S1302, in a case where it is determined that the first signal has not been received, the process returns to S1301. On the other hand, in S1302, in a case where it is determined that the first signal has been received, the process proceeds to S1303.

In S1303, the on-vehicle device 3200 causes the communication unit 3210 to transmit a response to the first signal received in S1202 by using an electromagnetic wave such as light.

In S1304, the on-vehicle device 3200 causes the second signal transmission units 3221 and 3222 to transmit encoded signals as the second signals.

In S1305, the on-vehicle device 3200 (for example, the control unit 3230) determines whether or not the position information detected (estimated) by the position detection unit 3140 of the ground device 3100 has been received by the positional relationship reception unit 3212 of the communication unit 3210.

In S1305, in a case where it is determined that the position information has not been received, the process returns to S1304. On the other hand, in S1305, in a case where it is determined that the position information has been received, the process proceeds to S1306.

In S1306, the on-vehicle device 3200 (for example, the control unit 3230) notifies a traveling control unit (not illustrated) controlling traveling of the vehicle V of the position information received in S1305, and reflects the position information in traveling control. The process returns to S1301.

As described above, the ground device 3100 according to the third embodiment includes the second signal reception units 3121 and 3122 as reception units receiving signals (second signals) transmitted from the on-vehicle device 3200 mounted on the vehicle V as a moving object; the power storage unit 3130 storing electric power generated according to reception of the second signals in the second signal reception units 3121 and 3122; and the first signal transmission unit 3111 and the position detection unit 3140 as processing units performing a process for detecting a position of the vehicle V by using the second signals based on the electric power stored in the power storage unit 3130.

According to the ground device 3100, since a process of detecting a position of a moving object can be performed without using a satellite, a position of the vehicle V can be recognized in an environment in which an error of positioning using a satellite is likely to become large, such as an indoor place or a valley of buildings. According to the ground device 3100, the supply of power to the ground device 3100 is realizable in a non-contact manner. Consequently, the supply of power to the device on the ground device 3100 is easily realizable (with a simple configuration) without separately preparing any means causing a complex configuration, such as a power supply wiring for connection to an external power source.

Modification Examples of Third Embodiment

Also in the third embodiment, modification examples similar to the modification examples of the first embodiment and the second embodiment may be supposed as appropriate. Specific contents of the modification examples of the first embodiment and the second embodiment have been described, and thus a description thereof will be omitted.

Fourth Embodiment

In the first to third embodiments, a description has been made of an example in which transmission and reception of the first signal are realized by using a single antenna. However, the technique of the present disclosure is applicable to an example in which a configuration of transmitting the first signal and a configuration of receiving the first signal are separately provided. For example, the technique of the present disclosure is applicable to an example in which a constituent element transmitting the first signal is a light emitting unit such as an LED, and a constituent element receiving the first signal is a light receiving unit such as a camera receiving light from the light emitting unit.

In the first to third embodiments, a description has been made of an example in which transmission of the second signal is realized by a transmitter, and reception of the second signal is realized by a receiver. However, the technique of the present disclosure is applicable to an example in which transmission and reception of the second signal are realized by a transducer functioning as both a transmitter and a receiver.

In the first to third embodiments, a description has been made of an example in which only a single constituent element transmitting and receiving the first signal is provided, that is, a constituent element transmitting and receiving the first signal is shared by two constituent elements transmitting and receiving the second signals. However, the technique of the present disclosure is applicable to an example in which two constituent elements transmitting and receiving the first signals are provided to respectively correspond to the two constituent elements transmitting and receiving the second signals.

Meanwhile, a normal operation of the position detection system as in the first to third embodiments is based on constituent elements transmitting and receiving the first signal and the second signal being normally operated. Therefore, in the position detection system as in the first to third embodiments, it is further useful to perform determination of whether or not constituent elements transmitting and receiving the first signal and the second signal are normally operated before a position is detected.

Therefore, in the fourth embodiment, determination of whether or not constituent elements transmitting and receiving the first signal and the second signal are normally operated is performed before a position is detected based on a configuration and an operation described below. Hereinafter, for convenience, the first signal and the second signal transmitted and received in the form as in the first to third embodiments will be respectively referred to as a first first-signal and a first second-signal in some cases.

Figure 14:
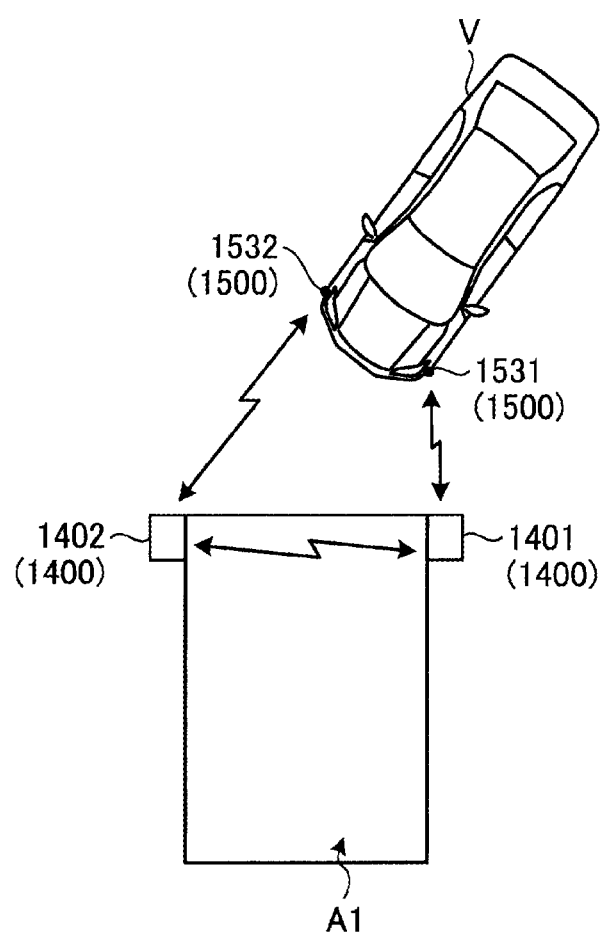
FIG. 14 is an exemplary and schematic diagram illustrating an application example of a position detection system according to a fourth embodiment.

FIG. 14 is an exemplary and schematic diagram illustrating an application example of a position detection system according to the fourth embodiment. As illustrated in FIG. 14, in the same manner as in the first to third embodiments, the position detection system according to the fourth embodiment is also applied to such a situation in which the vehicle V as a moving object is moved to the inside of the indoor region A1, and is parked and stopped therein, through automatic driving (semiautomatic driving).

As illustrated in FIG. 14, the position detection system according to the fourth embodiment includes two ground devices 1401 and 1402 which are stationarily provided near the region A1, and an on-vehicle device 1500 mounted on the vehicle V. Hereinafter, in a case where the ground devices 1401 and 1402 are not required to be particularly differentiated from each other, the ground devices 1401 and 1402 will be simply referred to as a ground device 1400 in some cases. The two ground devices 1400 are all an example of a "first device", one ground device 1400 is an example of a "first first-device", and the other ground device 1400 is an example of a "second first-device". The on-vehicle device 1500 is an example of a "second device".

Figure 15:
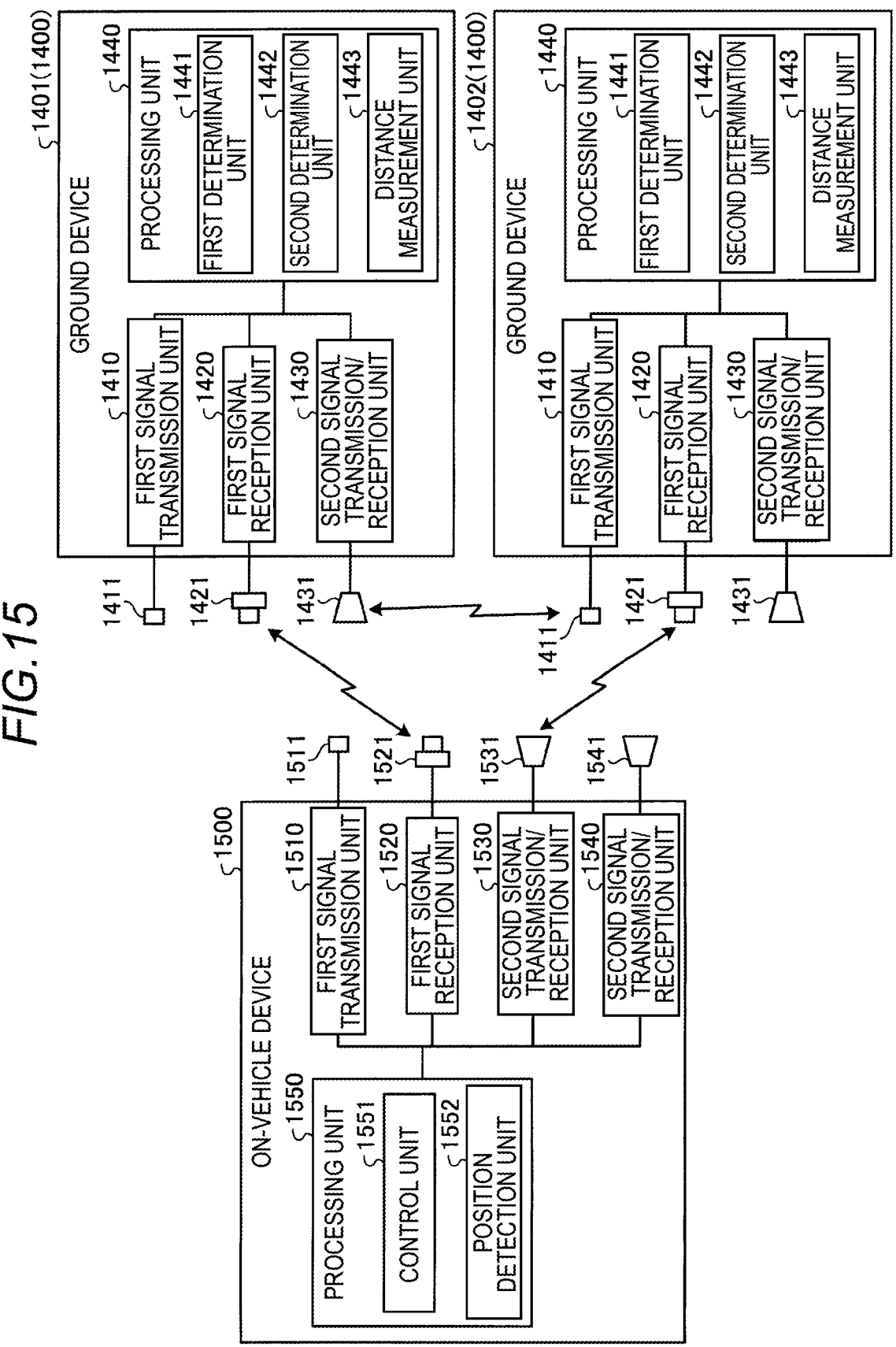
FIG. 15 is an exemplary and schematic block diagram illustrating functional configurations of a ground device and an on-vehicle device of the position detection system according to the fourth embodiment.

Here, in the example illustrated in FIG. 14, only two transducers 1531 and 1532 are illustrated as constituent elements on the on-vehicle device 1500 side transmitting and receiving the first second-signals, but, as illustrated in FIG. 15, in the fourth embodiment, each of the two ground devices 1400 and the on-vehicle device 1500 includes a constituent element transmitting and receiving the first first-signal and a constituent element transmitting and receiving the first second-signal. The two ground devices 1400 and the on-vehicle device 1500 are configured to be able to perform communication with each other by using light and sonic waves (ultrasonic waves). The light is an example of a first wave motion for transmitting and receiving the first first-signal, and the sonic wave (ultrasonic wave) is an example of a second wave motion for transmitting and receiving the first second-signal.

FIG. 15 is an exemplary and schematic block diagram illustrating functional configurations of the ground device 1400 and the on-vehicle device 1500 of the position detection system according to the fourth embodiment. The two ground devices 1401 and 1402 have the same configuration, and will thus be collectively described by using the same reference numerals without being differentiated.

As illustrated in FIG. 15, in the fourth embodiment, the ground device 1400 includes a first signal transmission unit 1410, a first signal reception unit 1420, a second signal transmission/reception unit 1430, and a processing unit 1440. The second signal transmission/reception unit 1430 is an example of a "second signal transmission unit", and is also an example of a "second signal reception unit".

The first signal transmission unit 1410 transmits a signal based on light via a light emitting unit 1411. In the fourth embodiment, a specification of the light emitting unit 1411 is set such that a signal based on light from the light emitting unit 1411 reaches both of the other ground device 1400 and the on-vehicle device 1500.

The first signal reception unit 1420 receives a signal based on light transmitted from the other ground device 1400 and the on-vehicle device 1500 via a light receiving unit 1421.

The second signal transmission/reception unit 1430 transmits and receives a signal based on a sonic wave (ultrasonic wave) between the other ground device 1400 and the on-vehicle device 1500 via a transducer 1431.

The processing unit 1440 performs various processes to be performed in the ground device 1400. The processing unit 1440 includes a first determination unit 1441, a second determination unit 1442, and a distance measurement unit 1443. The distance measurement unit 1443 of one of the ground devices 1401 and 1402 is an example of a "first distance measurement unit", and the other distance measurement unit 1443 is an example of a "second distance measurement unit".

As will be described later in detail, the first determination unit 1441 causes the first signal transmission unit 1410 and the first signal reception unit 1420 to transmit and receive a first determination signal based on light and a response to the first determination signal to and from the other ground device 1400, so as to determine whether or not the first signal transmission units 1410 and the first signal reception units 1420 of the two ground devices 1400 are abnormal. Hereinafter, for convenience of description, the first determination signal based on light and the response to the first determination signal will be referred to as second first-signals in some cases so as to be differentiated from the first first-signals for position detection.

The second determination unit 1442 causes the second signal transmission/reception unit 1430 to transmit and receive a second determination signal and a response to the second determination signal to and from the other ground device 1400, so as to determine whether or not the second signal transmission/reception units 1430 of the two ground devices 1400 are abnormal. Hereinafter, for convenience of description, the second determination signal based on a sonic wave (ultrasonic wave) and the response to the second determination signal will be referred to as second second-signals in some cases so as to be differentiated from the first second-signals for position detection.

Here, in a case where a determination result in the first determination unit 1441 indicates that at least one of the first signal transmission unit 1410 and the first signal reception unit 1420 of at least one of the two ground devices 1400 is abnormal, and a determination result in the second determination unit 1442 indicates the second signal transmission/reception units 1430 of both of the two ground devices 1400 are normal, transmission and reception of the first first-signal and the second second-signal for position detection cannot be performed, and thus position detection cannot be performed in the same method as in the first to third embodiments.

Therefore, in a case where a determination result in the first determination unit 1441 indicates that at least one of the first signal transmission unit 1410 and the first signal reception unit 1420 of at least one of the two ground devices 1400 is abnormal, and a determination result in the second determination unit 1442 indicates the second signal transmission/reception units 1430 of both of the two ground devices 1400 are normal, the distance measurement unit 1443 measures a distance between the ground device 1400 and the on-vehicle device 1500 as information for position detection according to a method which is different from the method in the first to third embodiments. The distance measured by the distance measurement unit 1443 is transmitted to the on-vehicle device 1500 via the second signal transmission/reception unit 1430 as a signal based on a sonic wave (ultrasonic wave).

Details of a method of the distance measurement unit 1443 measuring a distance will be described later with reference to a sequence diagram and a flowchart, and thus further description will be omitted here.

On the other hand, in the fourth embodiment, the on-vehicle device 1500 includes a first signal transmission unit 1510, a first signal reception unit 1520, two second signal transmission/reception units 1530 and 1540, and a processing unit 1550. The second signal transmission/reception units 1530 and 1540 are an example of a "second signal transmission unit", and are also an example of a "second signal reception unit".

The first signal transmission unit 1510 transmits a signal based on light via a light emitting unit 1511. In the fourth embodiment, a specification of the light emitting unit 1511 is set such that a signal based on light from the light emitting unit 1511 reaches both of the ground devices 1401 and 1402.

The first signal reception unit 1520 receives a signal based on light transmitted from the ground devices 1401 and 1402 via a light receiving unit 1521.

The second signal transmission/reception unit 1530 transmits and receives a signal based on a sonic wave (ultrasonic wave) between the ground devices 1401 and 1402 via a transducer 1531. Similarly, the second signal transmission/reception unit 1540 transmits and receives a signal based on a sonic wave (ultrasonic wave) between the ground devices 1401 and 1402 via the transducer 1541. The second signal transmission/reception units 1530 and 1540 are provided at different positions (refer to FIG. 14).

The processing unit 1550 performs various processes to be performed in the on-vehicle device 1500. The processing unit 1550 includes a control unit 1551 and a position detection unit 1552.

As will be described later in detail, the control unit 1551 sets the second signal transmission/reception units 1530 and 1540 to a reception mode for receiving only a signal based on a sonic wave (ultrasonic wave) under a predetermined condition. The position detection unit 1552 detects the current position of the vehicle V.

Here, in the fourth embodiment, in a case where a determination result in the first determination unit 1441 indicates that at least one of the first signal transmission unit 1410 and the first signal reception unit 1420 of at least one of the two ground devices 1400 is abnormal, and a determination result in the second determination unit 1442 indicates the second signal transmission/reception units 1430 of both of the two ground devices 1400 are normal, the position detection unit 1552 detects the current position of the vehicle V based on a measurement result in the distance measurement unit 1443, acquired by the second signal transmission/reception units 1530 and 1540. Consequently, in the fourth embodiment, the current position of the vehicle V can be detected even in a case where transmission and reception of the first first-signal and the first second-signal cannot be performed in the same form as in the first to third embodiments.

In the fourth embodiment, in a case where a determination result in the first determination unit 1441 indicates that both of the first signal transmission unit 1410 and the first signal reception unit 1420 of the two ground devices 1400 are normal, and a determination result in the second determination unit 1442 indicates that the second signal transmission/reception units 1430 of both of the two ground devices 1400 are normal, transmission and reception of the first first-signal and the first second-signal can be performed in the same form as in the first to third embodiments. Therefore, in this case, the ground device 1400 and the on-vehicle device 1500 perform transmission and reception of the first first-signal and the first second-signal as a normal operation in the same form as in the first to third embodiments, and the position detection unit 1552 detects the current position of the vehicle V in the same method as in the first to third embodiments.

Hereinafter, with reference to FIG. 16, as a flow a characteristic operation in the fourth embodiment, a description will be made of a flow of a cooperative operation of the ground device 1400 and the on-vehicle device 1500 in a case where a determination result in the first determination unit 1441 indicates that at least one of the first signal transmission unit 1410 and the first signal reception unit 1420 of at least one of the two ground devices 1400 is abnormal, and a determination result in the second determination unit 1442 indicates the second signal transmission/reception units 1430 of both of the two ground devices 1400 are normal.

Figure 16:
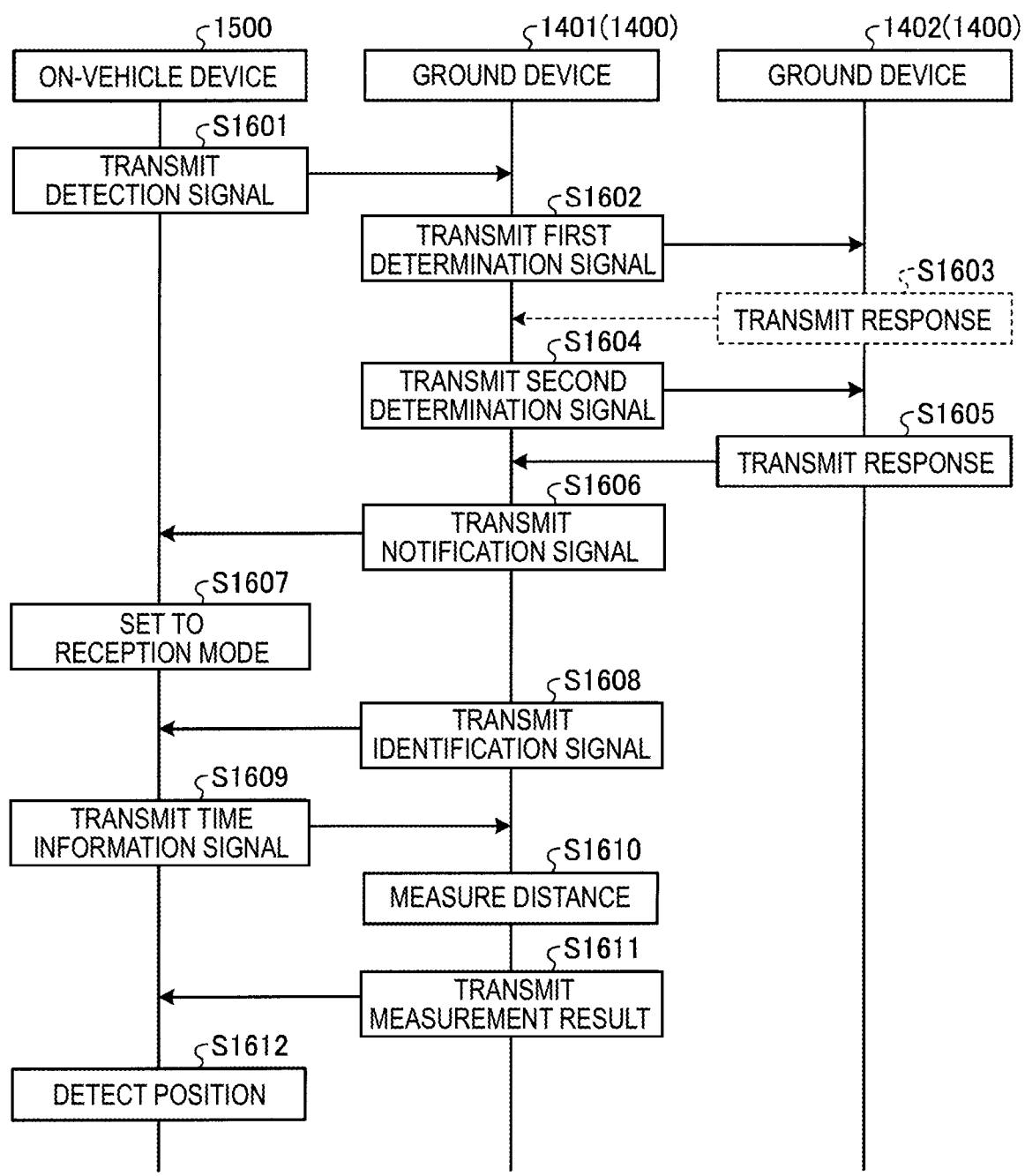
FIG. 16 is an exemplary and schematic sequence diagram illustrating examples of operations of the ground device and the on-vehicle device of the position detection system according to the fourth embodiment.

FIG. 16 is an exemplary and schematic sequence diagram illustrating examples of operations of the ground device 1400 and the on-vehicle device 1500 of the position detection system according to the fourth embodiment.

As illustrated in FIG. 16, first, in S1601, the on-vehicle device 1500 causes the second signal transmission/reception units 1530 and 1540 to transmit detection signals based on sonic waves (ultrasonic waves) to the ground device 1400. The detection signals are transmitted automatically or in response to a driver's operation, for example, in such a situation in which an obstacle is detected during automatic driving the vehicle V.

In S1602, in a case where the detection signals are received, the ground device 1401 causes the first signal transmission unit 1410 to transmit the first determination signal based on light to the ground device 1402. As described above, the first determination signal is an example of a second first-signal used to determine whether or not the first signal transmission units 1410 and the first signal reception units 1420 of the ground devices 1401 and 1402 are abnormal.

In a case where the first determination signal normally reaches the ground device 1402 from the ground device 1401, in S1603, the ground device 1402 causes the first signal transmission unit 1410 to transmit a response to the first determination signal to the ground device 1401.

However, (1) in a case where the first signal transmission unit 1410 of the ground device 1401 is abnormal, (2) in a case where the first signal transmission unit 1410 of the ground device 1401 is normal, but the first signal reception unit 1420 of the ground device 1402 is abnormal, (3) in a case where the first signal transmission unit 1410 of the ground device 1401 and the first signal reception unit 1420 of the ground device 1402 are normal, but the first signal transmission unit 1410 of the ground device 1401 is abnormal, and (4) in a case where the first signal transmission unit 1410 of the ground device 1401 and the first signal transmission unit 1410 and the first signal reception unit 1420 of the ground device 1402 are normal, the first signal reception unit 1420 of the ground device 1401 is abnormal, the first determination signal and the response to the first determination signal are not normally transmitted and received between the ground device 1401 and the ground device 1402.

Therefore, in a case where the response to the first determination signal is not received within a predetermined time, for example, after the first determination signal is transmitted, the first determination unit 1441 of the ground device 1401 determines that the case corresponds to any one of the above (1) to (4), and at least one of the first signal transmission unit 1410 and the first signal reception unit 1420 of at least one of the ground devices 1401 and 1402 is abnormal.

Hereinafter, a description will be made assuming that the first determination unit 1441 determines that at least one of the first signal transmission unit 1410 and the first signal reception unit 1420 of at least one of the ground devices 1401 and 1402 is abnormal.

In S1604, the ground device 1401 causes the second signal transmission/reception unit 1430 to transmit the second determination signal based on a sonic wave (ultrasonic wave) to the ground device 1402. As described above, the second determination signal is an example of a second second-signal used to determine whether or not the second signal transmission/reception units 1430 of the ground devices 1401 and 1402 are abnormal.

In a case where the second determination signal normally reaches the ground device 1402 from the ground device 1401, in S1605, the ground device 1402 causes the second signal transmission/reception unit 1430 to transmit a response to the second determination signal to the ground device 1401.

However, (5) in a case where a transmission function of the second signal transmission/reception unit 1430 of the ground device 1401 is abnormal, (6) in a case where a transmission function of the second signal transmission/reception unit 1430 of the ground device 1401 is normal, but a reception function of the second signal transmission/reception unit 1430 of the ground device 1402 is abnormal, (7) in a case where a transmission function of the second signal transmission/reception unit 1430 of the ground device 1401 and a reception function of the second signal transmission/reception unit 1430 of the ground device 1402 are normal, but a transmission function of the second signal transmission/reception unit 1430 of the ground device 1402 is abnormal, and (8) in a case where a transmission function of the second signal transmission/reception unit 1430 of the ground device 1401, and a reception function and a transmission function of the second signal transmission/reception unit 1430 of the ground device 1402 are normal, but a reception function of the second signal transmission/reception unit 1430 of the ground device 1401 is abnormal, the second determination signal and the response to the second determination signal are not normally transmitted and received between the ground device 1401 and the ground device 1402.

Therefore, in a case where the response to the second determination signal is not received within a predetermined time, for example, after the second determination signal is transmitted, the second determination unit 1442 of the ground device 1401 determines that the case corresponds to any one of the above (5) to (8), and the second signal transmission/reception unit 1430 of at least one of the ground devices 1401 and 1402 is abnormal.

Hereinafter, a description will be made assuming that the second determination unit 1442 determines that the second signal transmission/reception units 1430 of both of the ground device 1401 and the ground device 1402 are normal. In this case, the ground device 1401 causes the second signal transmission/reception unit 1430 to transmit a notification signal and an identification signal as will be described below, based on sonic waves (ultrasonic waves), to the on-vehicle device 1500 in a stepwise manner. Hereinafter, the notification signal and the identification signal will be referred to as third second-signals in some cases so as to be differentiated from the first and second second-signals.

In S1606, the ground device 1401 causes the second signal transmission/reception unit 1430 to transmit the notification signal as one of the third second-signals to the on-vehicle device 1500. The notification signal is a signal encoded to include a notification that at least one of the first signal transmission unit 1410 and the first signal reception unit 1420 of at least one of the ground devices 1401 and 1402.

In S1607, the on-vehicle device 1500 sets the second signal transmission/reception units 1530 and 1540 to a reception mode in preparation for further reception of a signal based on a sonic wave (ultrasonic wave) from the ground device 1401, in response to reception of the notification signal.

In S1608, the ground device 1401 causes the second signal transmission/reception unit 1430 to transmit the identification signal as the other signal of the third second-signals to the on-vehicle device 1500. The identification signal is a signal encoded to include predetermined identification information (for example, identification information of the ground device 1401). In this case, the ground device 1401 stores a transmission timing of the identification signal.

In S1609, the on-vehicle device 1500 causes the second signal transmission/reception units 1530 and 1540 to transmit time information signals based on sonic waves (ultrasonic waves) to the ground device 1401 in response to reception of the identification signal. The time information signal is a signal encoded to include a preparation time required for the second signal transmission/reception units 1530 and 1540 of the on-vehicle device 1500 to transmit the time information signals from reception of the identification signal. The preparation time includes a predetermined time defined according to a specification of circuits of the second signal transmission/reception units 1530 and 1540. Hereinafter, the time information signal will be referred to as a fourth second-signal in some cases so as to be differentiated from the first second-signal to third second-signal.

In S1610, the ground device 1401 causes the distance measurement unit 1443 to measure a distance between the ground device 1401 and the on-vehicle device 1500 in response to reception of the time information signals. More specifically, the ground device 1401 measures a distance between the ground device 1401 and the on-vehicle device 1500 by taking into consideration a sonic speed based on a time obtained by subtracting the preparation time extracted from the time information signal, from a difference between a transmission timing of the identification signal and a reception timing of the time information signal. Since the time obtained by subtracting the preparation time from the difference between the transmission timing of the identification signal and the reception timing of the time information signal corresponds to a round-trip time of a sonic wave (ultrasonic wave) between the ground device 1401 and the on-vehicle device 1500, for example, in a case where a product of the round-trip time and the sonic speed is divided by 2, a distance between the ground device 1401 and the on-vehicle device 1500 can be measured (estimated).

In S1611, the ground device 1401 causes the second signal transmission/reception unit 1430 to carry the measurement result in S1610 on a signal based on a sonic wave (ultrasonic wave) and transmit the signal to the on-vehicle device 1500. More specifically, the ground device 1401 causes the second signal transmission/reception unit 1430 to transmit a signal encoded to include the distance measured in S1610 to the on-vehicle device 1500.

In S1612, the on-vehicle device 1500 specifies a positional relationship between the ground device 1401 and the on-vehicle device 1500 in response to reception of the measurement result in the distance measurement unit 1443 of the ground device 1401, and detects a position of the vehicle V based on the specified positional relationship. Although not illustrated in FIG. 16, the ground device 1402 performs the same operation as that of the ground device 1401 in response to reception of the detection signal from the on-vehicle device 1500, and thus the on-vehicle device 1500 receives a measurement result in the distance measurement unit 1443 of the ground device 1402 in the same manner. Therefore, in S1612, the on-vehicle device 1500 specifies both of a positional relationship between the ground device 1401 and the on-vehicle device 1500 and a positional relationship between the ground device 1402 and the on-vehicle device 1500, and detects a position of the vehicle V based on the specified positional relationships.

As mentioned above, the ground device 1400 and the on-vehicle device 1500 according to the fourth embodiment detects the current position of the vehicle V based on transmission and reception results of the second to fourth second-signals even in a case where transmission and reception of the first first-signal and the first second-signal cannot be performed in the same form as in the first to third embodiments.

In the fourth embodiment, a case is supposed in which determination results in the first determination unit 1441 and the second determination unit 1442 indicate other patterns which are different from a pattern (a pattern in which transmission and reception of a signal based on light are not possible but transmission and reception of a signal based on a sonic wave (ultrasonic wave) are possible) as a basis of the example illustrated in FIG. 16.

For example, in the fourth embodiment, a case is also supposed in which a determination result in the first determination unit 1441 indicates that both of the first signal transmission unit 1410 and the first signal reception unit 1420 of both of the two ground devices 1400 are normal, and a determination result in the second determination unit 1442 indicates that the second signal transmission/reception units 1430 of both of the two ground devices 1400 are normal. In this case, the ground device 1400 and the on-vehicle device 1500 perform transmission and reception of the first first-signal and the first second-signal for position detection as a normal operation in the same form as in the first to third embodiments, and detects the current position of the vehicle V in the same method as in the first to third embodiments.

In the fourth embodiment, a case is also supposed in which a determination result in the first determination unit 1441 indicates that at least one of the first signal transmission unit 1410 and the first signal reception unit 1420 of at least one of the two ground devices 1400 is abnormal, and a determination result in the second determination unit 1442 indicates the second signal transmission/reception unit 1430 of at least one of the two ground devices 1400 is abnormal. As will be described later in detail, in this case, the ground device 1400 transmits a system abnormality signal based on a sonic wave (ultrasonic wave) for notification of abnormality to the on-vehicle device 1500, and the on-vehicle device 1500 finishes execution of communication with the ground device 1400 using a signal based on light and a signal based on a sonic wave (ultrasonic wave) in response to reception of the system abnormality signal. Hereinafter, the system abnormality signal will be referred to as an eighth second-signal in some cases so as to be differentiated from the first to fourth second-signals. A fifth second-signal to a seventh second-signal will be described in a modification example (refer to FIG. 19) which will be described later.

Hereinafter, a description will be made of each of a series of processes performed by the ground device 1400 and the on-vehicle device 1500.

Figure 17:
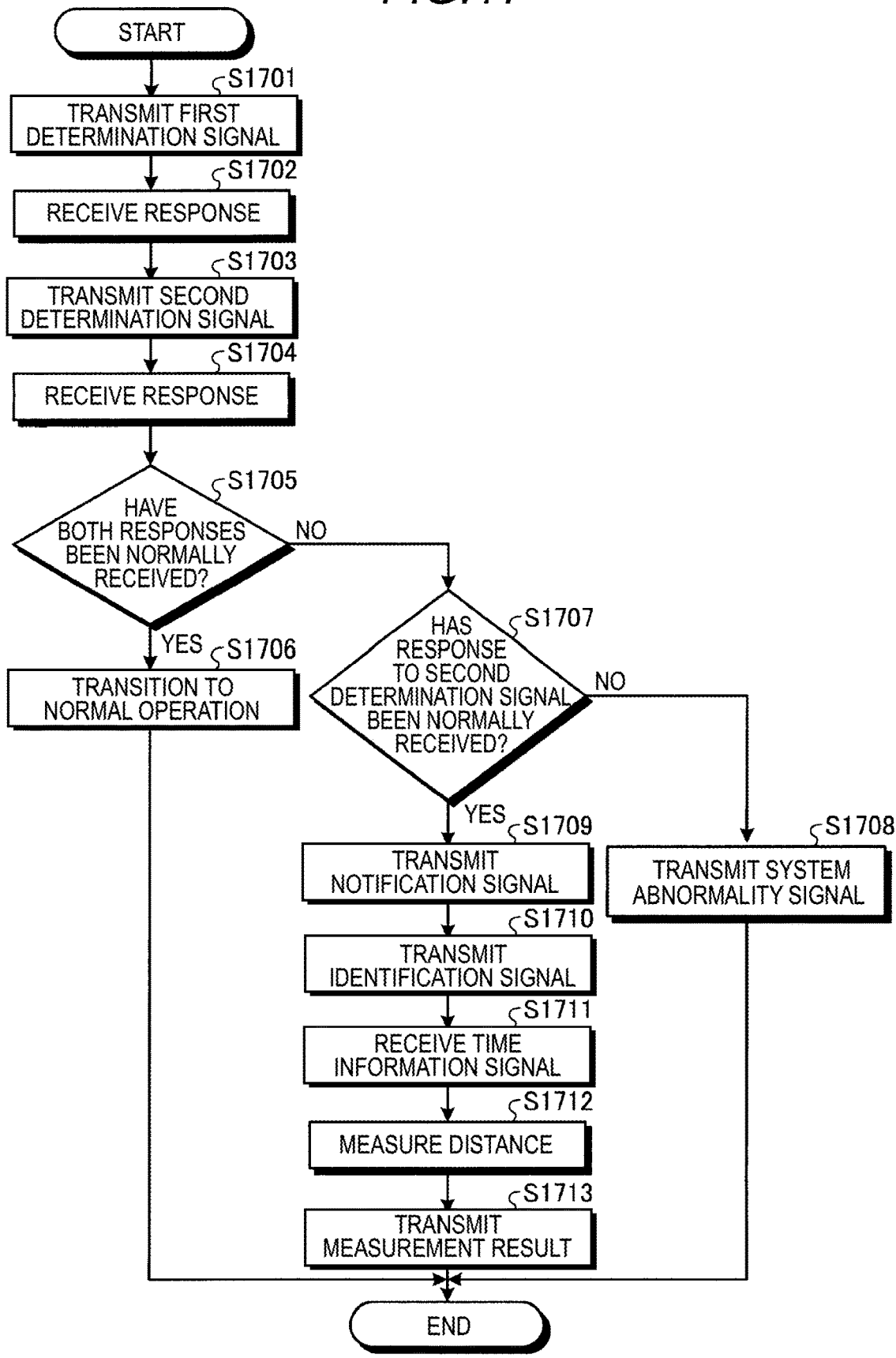
FIG. 17 is an exemplary and schematic flowchart illustrating a process performed by the ground device of the position detection system according to the fourth embodiment.

FIG. 17 is an exemplary and schematic flowchart illustrating a process performed by the ground device 1400 of the position detection system according to the fourth embodiment. A series of processes illustrated in FIG. 17 is started in response to reception of the detection signals (refer to S1601 in FIG. 16) from the on-vehicle device 1500.

As illustrated in FIG. 17, in the fourth embodiment, first, in S1701, the ground device 1400 causes the first signal transmission unit 1410 to transmit the first determination signal as the second first-signal to the other ground device 1400.

In S1702, the ground device 1400 causes the first signal reception unit 1420 to receive a response to the first determination signal.

In S1703, the ground device 1400 causes the second signal transmission/reception unit 1430 to transmit the second determination signal as the second second-signal to the other ground device 1400.

In S1704, the ground device 1400 causes the second signal transmission/reception unit 1430 to receive a response to the second determination signal.

In S1705, the ground device 1400 causes the first determination unit 1441 and the second determination unit 1442 to determine whether or not both of the response to the first determination signal and the response to the second determination signal have been normally received.

In S1705, in a case where it is determined that both of the responses have been normally received, transmission and reception of the first first-signal and the first second-signal can be normally performed in the same form as in the first to third embodiments. Therefore, in this case, the process proceeds to S1706, and, in S1706, the ground device 1400 transitions to a normal operation for performing position detection in the same method as in the first to third embodiments. The process is finished.

On the other hand, in S1705, in a case where it is determined that both of the responses have not been normally received, the process proceeds to S1707. In S1707, the ground device 1400 causes the first determination unit 1441 and the second determination unit 1442 to determine whether or not the response to the second determination signal has been normally received.

In S1707, in a case where it is determined that the response to the second determination signal has not been normally received, neither transmission and reception of the first first-signal and the first second-signal nor transmission and reception of the third second-signal and fourth second-signal can be normally performed. Therefore, in this case, the process proceeds to S1708, and, in S1708, the ground device 1400 causes the second signal transmission/reception unit 1430 to transmit the system abnormality signal as the eighth second-signal to the on-vehicle device 1500. In a case where the response to the second determination signal is not normally received due to abnormality of only the second signal transmission/reception unit 1430 of the other ground device 1400, the system abnormality signal normally reaches the on-vehicle device 1500. The process is finished.

On the other hand, in S1707, in a case where it is determined that the response to the second determination signal has been normally received, transmission and reception of the first first-signal and the first second-signal cannot be normally performed, but transmission and reception of the third second-signal and the fourth second-signal can be normally performed. Therefore, in this case, the process proceeds to S1709, and, in S1709, the ground device 1400 causes the second signal transmission/reception unit 1430 to transmit the notification signal as one of the third second-signals to the on-vehicle device 1500.

In S1710, the ground device 1400 causes the second signal transmission/reception unit 1430 to transmit the identification signal as the other of the third second-signals to the on-vehicle device 1500.

In S1711, the ground device 1400 causes the second signal transmission/reception unit 1430 to receive the time information signal as the fourth second-signal which is to be transmitted by the on-vehicle device 1500 according to the identification signal. As described above, the preparation time required for the second signal transmission/reception units 1530 and 1540 of the on-vehicle device 1500 to transmit the time information signal from reception of the identification signal may be extracted from the time information signal.

In S1712, the ground device 1400 causes the distance measurement unit 1443 to measure a distance between the ground device 1401 and the on-vehicle device 1500 by taking into consideration a sonic speed based on a time obtained by subtracting the preparation time extracted from the time information signal, from a difference between a transmission timing of the identification signal and a reception timing of the time information signal.

In S1713, the ground device 1400 causes the second signal transmission/reception unit 1430 to carry the measurement result in S1712 on a signal based on a sonic wave (ultrasonic wave) and transmit the signal to the on-vehicle device 1500. The process is finished.

Figure 18:
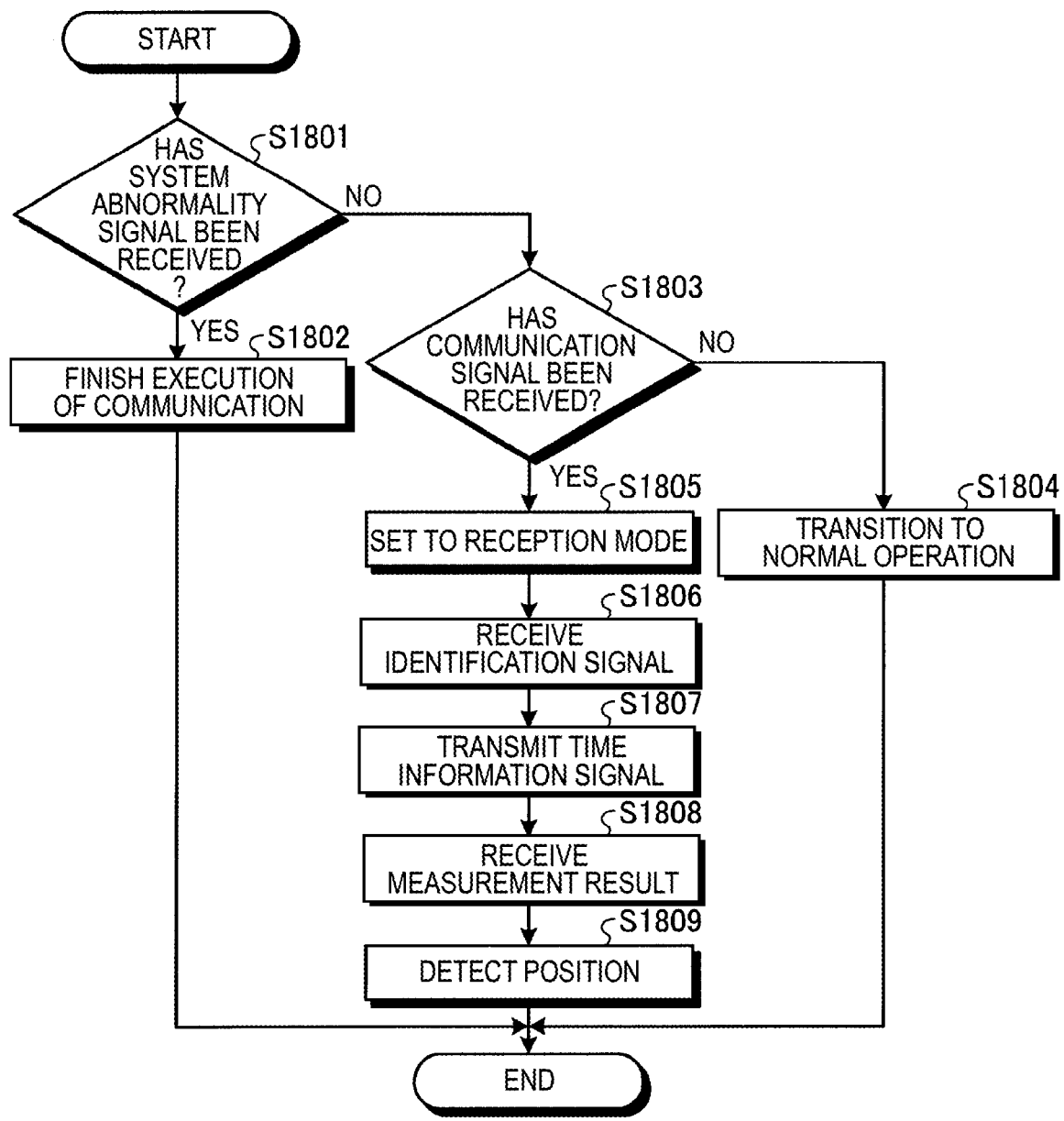
FIG. 18 is an exemplary and schematic flowchart illustrating a process performed by the on-vehicle device of the position detection system according to the fourth embodiment.

On the other hand, FIG. 18 is an exemplary and schematic flowchart illustrating a process performed by the on-vehicle device 1500 of the position detection system according to the fourth embodiment. A series of processes illustrated in FIG. 18 is started after the second signal transmission/reception units 1530 and 1540 transmit the detection signals (refer to S1601 in FIG. 16).

As illustrated in FIG. 18, in the fourth embodiment, first, in S1801, the on-vehicle device 1500 causes the second signal transmission/reception units 1530 and 1540 to determine whether or not the system abnormality signal as the eighth second-signal has been received from the ground device 1400.

In S1801, in a case where it is determined that the system abnormality signal has been received, it may be determined that communication with the ground device 1400 cannot be normally performed by using a signal based on light or a signal based on a sonic wave (ultrasonic wave). Therefore, in this case, the process proceeds to S1802, and, in S1802, the on-vehicle device 1500 finishes execution of communication with the ground device 1400 in the first signal transmission unit 1510, the first signal reception unit 1520, and the second signal transmission/reception units 1530 and 1540. The process is finished.

On the other hand, in S1801, in a case where it is determined that the system abnormality signal has not been received, the process proceeds to S1803. In S1803, the on-vehicle device 1500 causes the second signal transmission/reception units 1530 and 1540 to determine whether or not the notification signal as one of the third second-signals transmitted from the ground device 1400 has been received.

In S1803, in a case where it is determined that the notification signal has not been received, transmission and reception of the first first-signal and the first second-signal can be normally performed in the same form as in the first to third embodiments. Therefore, in this case, the process proceeds to S1804, and, in S1804, the on-vehicle device 1500 transitions to a normal operation for performing position detection in the same method as in the first to third embodiments. The process is finished.

On the other hand, in S1803, in a case where the notification signal has been received, it can be predicted that the identification signal as the other of the third second-signals is subsequently received. Therefore, in this case, the process proceeds to S1805, and, in S1805, the on-vehicle device 1500 sets the second signal transmission/reception units 1530 and 1540 to a reception mode for reception only.

In S1806, the on-vehicle device 1500 causes the second signal transmission/reception units 1530 and 1540 to receive the identification signal transmitted from the ground device 1400 subsequently to the notification signal.

In S1807, the on-vehicle device 1500 causes the second signal transmission/reception units 1530 and 1540 to transmit the time information signals as the fourth second-signal to the ground device 1400. As described above, the time information signal is a signal encoded to include a preparation time required for the second signal transmission/reception units 1530 and 1540 of the on-vehicle device 1500 to transmit the time information signal from reception of the identification signal.

In S1808, the on-vehicle device 1500 causes the second signal transmission/reception units 1530 and 1540 to receive the measurement result in the distance measurement unit 1443 transmitted from the ground device 1400.

In S1809, the on-vehicle device 1500 detects a position of the vehicle V based on the measurement result received in S1809. The process is finished.

As described above, in the fourth embodiment, each of the two ground devices 1400 includes the first determination unit 1441 and the second determination unit 1442. The first determination unit 1441 causes the first signal transmission unit 1410 and the first signal reception unit 1420 to perform transmission and reception of the second first-signal with the other ground device 1400, so as to determine whether or not the first signal transmission units 1410 and the first signal reception units 1420 of the two ground devices 1400 are abnormal. The second determination unit 1442 causes the second signal transmission/reception unit 1430 to perform transmission and reception of the second second-signal with the other ground device 1400, so as to determine whether or not the second signal transmission/reception units 1430 of the two ground devices 1400 are abnormal.

Here, in the fourth embodiment, a case is supposed in which a determination result in the first determination unit 1441 indicates that both of the first signal transmission unit 1410 and the first signal reception unit 1420 of both of the two ground devices 1400 are normal, and a determination result in the second determination unit 1442 indicates that both of the second signal transmission/reception units 1430 of both of the two ground devices 1400 are normal. In this case, in the same manner as in the first to third embodiments, one of the ground device 1400 and the on-vehicle device 1500 performs transmission and reception of the first first-signal with the other of the ground device 1400 and the on-vehicle device 1500, and also performs transmission and reception of the first second-signal. According to this configuration, the presence or absence of the abnormality of the first signal transmission unit 1410, the first signal reception unit 1420, and the second signal transmission/reception unit 1430 can be checked between the two ground devices 1400, and then transmission and reception of the first first-signal and the first second-signal for position detection can be reliably performed.

In the fourth embodiment, a case is supposed in which a determination result in the first determination unit 1441 indicates that at least one of the first signal transmission unit 1410 and the first signal reception unit 1420 of at least one of the two ground devices 1400 is abnormal, and a determination result in the second determination unit 1442 indicates the second signal transmission/reception units 1430 of both of the two ground devices 1400 are normal. In this case, the second signal transmission/reception units 1430 of the ground devices 1400 transmit the third second-signals to the on-vehicle device 1500, and the second signal transmission/ reception units 1530 and 1540 of the on-vehicle device 1500 transmit the fourth second-signals to the ground devices 1400 in response to reception of the third second-signals. The ground device 1400 includes the distance measurement unit 1443 which measures a distance between the ground device 1400 and the on-vehicle device 1500 as a positional relationship between the ground device 1400 and the on-vehicle device 1500 based on a difference between a transmission timing of the third second-signal and a reception timing of the fourth second-signal. The position detection unit 1552 detects a position of the vehicle V based on a measurement result in the distance measurement unit 1443 of each of the two ground devices 1400. According to this configuration, even in a case where transmission and reception of the first first-signal cannot be performed, position detection can be performed based on transmission and reception results of the third and fourth second-signals.

In the fourth embodiment, the second signal transmission/reception units 1530 and 1540 of the on-vehicle device 1500 transmit the time information signals as the fourth second-signal encoded to include the time required to transmit the fourth second-signal from reception of the third second-signal, to the ground devices 1400. The distance measurement unit 1443 measures a distance between the ground device 1400 and the on-vehicle device 1500 based on a time obtained by subtracting the preparation time extracted from the time information signal, from a difference between a transmission timing of the third second-signal and a reception timing of the time information signal. According to this configuration, a round-trip time of a signal between the ground device 1400 and the on-vehicle device 1500 can be accurately calculated by taking into consideration a preparation time, and thus a distance between the ground device 1400 and the on-vehicle device 1500 can be accurately measured.

In the fourth embodiment, the second signal transmission/reception unit 1430 of the ground device 1400 transmits, as the third second-signals, the notification signal encoded to include a notification that at least one of the first signal transmission unit 1410 and the first signal reception unit 1420 of at least one of the two ground devices 1400 is abnormal, and the identification signal encoded to include predetermined identification, to the on-vehicle device 1500 in a stepwise manner. The on-vehicle device 1500 includes the control unit 1551 which sets the second signal transmission/reception units 1530 and 1540 of the on-vehicle device 1500 to a reception mode in preparation for reception of the identification signal in response to reception of the notification signal. The second signal transmission/reception units 1530 and 1540 transmit the time information signals to the ground devices 1400 in response to reception of the identification signal. According to this configuration, the second signal reception unit of the second device can reliably receive the identification signal.

In the fourth embodiment, a case is supposed in which a determination result in the first determination unit 1441 indicates that at least one of the first signal transmission unit 1410 and the first signal reception unit 1420 of at least one of the two ground devices 1400 is abnormal, and a determination result in the second determination unit 1442 indicates that the second signal transmission/reception units 1430 of both of the two ground devices 1400 are abnormal. In this case, the second signal transmission/reception unit 1430 of the ground device 1400 performs transmission of the eighth second-signal to the on-vehicle device 1500, and the on-vehicle device 1500 includes the control unit 1551 which finishes execution of communication with the ground device 1400 in the first signal transmission unit 1510, the first signal reception unit 1520, and the second signal transmission/reception units 1530 and 1540 in response to reception of the eighth second-signal. According to this configuration, in a case where normal communication with the ground device 1400 cannot be expected, the on-vehicle device 1500 can finish execution of the communication.

Other effects of the fourth embodiment are the same as those in the first and second embodiments.

Modification Example of Fourth Embodiment

In the fourth embodiment, an example has been described in which, in a case where transmission and reception of the first first-signal above-described the first second-signal cannot be normally performed, the ground device side measures a distance between the ground device and the on-vehicle device based on transmission and reception results of the notification signal and the identification signal as the third second-signals and the time information signal as the fourth second-signal. However, in a case where the third second-signal is encoded to include a transmission timing of the third second-signal, and is then transmitted to the on-vehicle device from the ground device, the on-vehicle device side can easily specify a distance between the ground device and the on-vehicle device based on a difference between a reception timing of the third second-signal and the transmission timing of the third second-signal extracted from the third second-signal.

In other words, as a modification example of the fourth embodiment, there may be a configuration in which "a position detection unit is provided in the on-vehicle device, and, in a case where a determination result in a first determination unit indicates that at least one of a first signal transmission unit and a first signal reception unit of at least one of two ground devices is abnormal, and a determination result in a second determination unit indicates second signal transmission/reception units of both of the two ground devices are normal, a second signal transmission unit of the ground device encodes a third second-signal to include information regarding a transmission timing of third second-signal, and transmits the third second-signal to the on-vehicle device, and the position detection unit of the on-vehicle device specifies a positional relationship between the ground device and the on-vehicle device based on a difference between a reception timing of the third second-signal and the transmission timing of the third second-signal extracted from the third second-signal". According to this configuration, the position detection unit of the on-vehicle device can easily specify a positional relationship between the ground device and the on-vehicle device based on only transmission and reception of the third second-signal.

Figure 19:
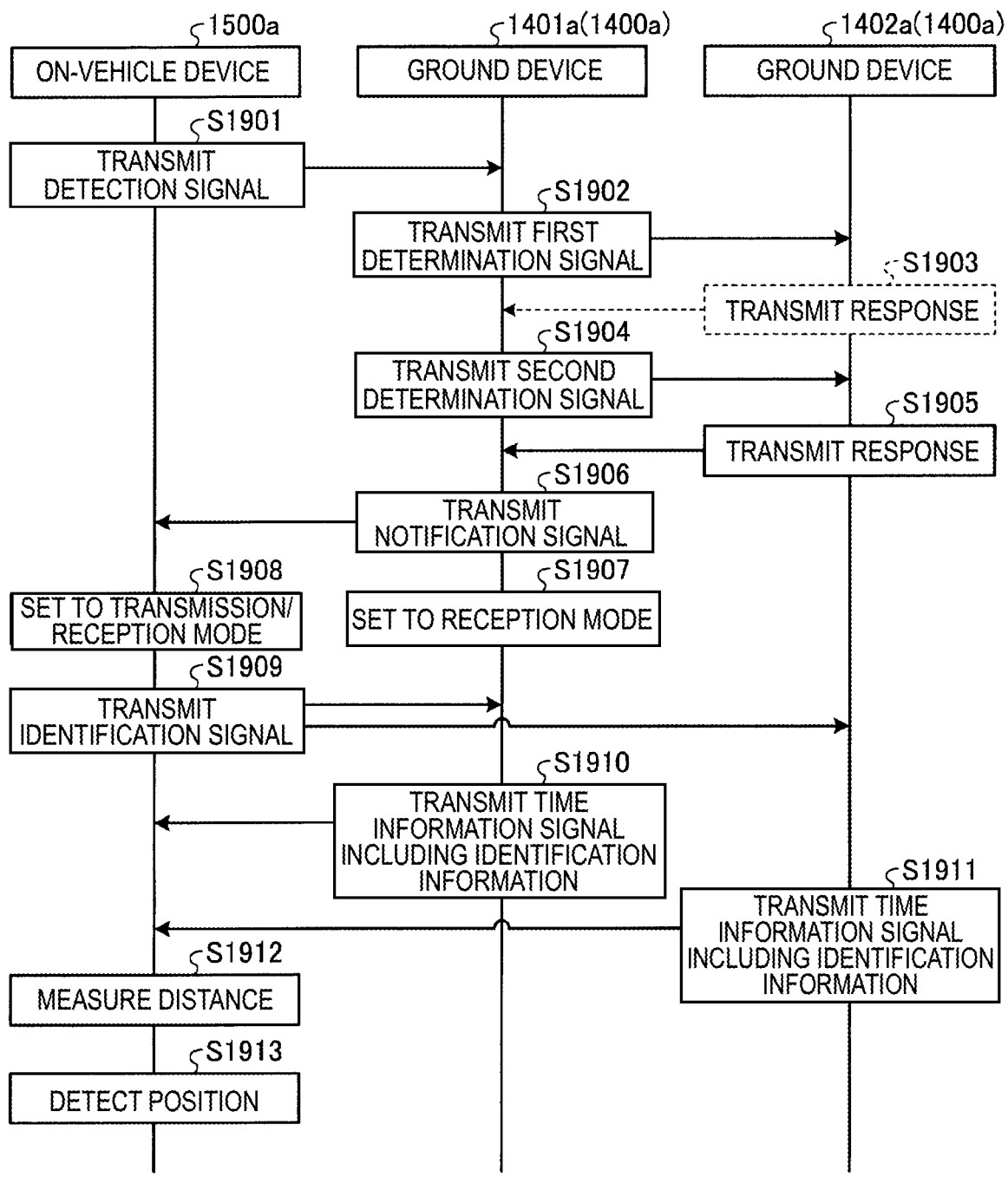
FIG. 19 is an exemplary and schematic sequence diagram illustrating examples of operations of a ground device and an on-vehicle device of a position detection system according to a modification example of the fourth embodiment.

As a modification example in which the on-vehicle device side specifies a positional relationship between the ground device and the on-vehicle device, there may be a modification example as illustrated in FIG. 19.

FIG. 19 is an exemplary and schematic sequence diagram illustrating examples of operations of ground devices 1400*a* (1401*a* and 1402*a*) and an on-vehicle device 1500*a* of a position detection system according to a modification example of the fourth embodiment.

Configurations of the ground devices 1400*a* (1401*a* and 1402*a*) and the on-vehicle device 1500*a* according to the modification example illustrated in FIG. 19 are fundamentally the same as the configurations of the ground devices 1400 (1401 and 1402) and the on-vehicle device 1500 according to the fourth embodiment (refer to FIG. 15).

However, as will be described later in detail, in the modification example illustrated in FIG. 19, unlike the fourth embodiment, measurement of a distance between the ground device 1400*a* and the on-vehicle device 1500*a* is performed by the on-vehicle device 1500*a* side instead of the ground device 1400*a* side.

In the modification example illustrated in FIG. 19, determination of the presence or absence of abnormality of constituent elements transmitting and receiving a signal based on light, corresponding to the first signal transmission unit 1410 and the first signal reception unit 1420 according to the fourth embodiment (refer to FIG. 15) and constituent elements transmitting and receiving a signal based on a sonic wave (ultrasonic wave), corresponding to the second signal transmission/reception unit 1430 according to the fourth embodiment (refer to FIG. 15), is performed in the same order as in the fourth embodiment (refer to FIG. 16).

Therefore, in the process sequence illustrated in FIG. 19, processes in S1901 to S1905 corresponding to determination of the presence or absence of abnormality are the same as the processes in S1601 to S1605 illustrated in FIG. 16. In the same manner as the process sequence illustrated in FIG. 16, the process sequence illustrated in FIG. 19 illustrates a flow of a cooperative operation of the ground device 1400*a* and the on-vehicle device 1500*a* in a case where at least one of the two ground devices 1400*a* cannot transmit and receive a signal based on light, and both of the two ground devices 1400*a* can normally transmit and receive signals based on sonic waves (ultrasonic waves).

After the processes in S1901 to S1905 are performed, in S1906, the ground device 1401*a* transmits a notification signal as a signal based on a sonic wave (ultrasonic wave) to the on-vehicle device 1500*a*. The notification signal transmitted in S1906 has the substantially same function as that of the notification signal transmitted in S1606 in the fourth embodiment (refer to FIG. 16), but, hereinafter, the notification signal transmitted in S1906 will be referred to as a fifth second-signal in some cases so as to be clearly differentiated from the various second signals in the fourth embodiment.

In S1907, the ground device 1401*a* sets a constituent element transmitting and receiving a signal based on a sonic wave (ultrasonic wave), corresponding to the second signal transmission/reception unit 1430 according to the fourth embodiment (refer to FIG. 15), to a reception mode for reception only, in preparation for reception of an identification signal transmitted from the on-vehicle device 1500*a* in S1909 which will be described later.

On the other hand, in S1908, the on-vehicle device 1500*a* sets constituent elements transmitting and receiving signals based on sonic waves (ultrasonic waves), corresponding to the second signal transmission/reception units 1530 and 1540 according to the fourth embodiment (refer to FIG. 15), to a transmission/reception mode in which transmission or reception can be performed, in response to reception of the notification signal.

In S1909, the on-vehicle device 1500*a* transmits predetermined identification signals as signals based on sonic waves (ultrasonic waves) to both of the ground devices 1401*a* and 1402*a*. In this case, the on-vehicle device 1500*a* stores a transmission timing of each of the identification signals in order to perform a process in S1912 which will be described later. The notification signal transmitted in S1909 has the substantially same function as that of the identification signal transmitted in S1608 in the fourth embodiment (refer to FIG. 16), but, hereinafter, the identification signal transmitted in S1909 will be referred to as a sixth second-signal in some cases so as to be clearly differentiated from the first to fifth second-signals, and the eighth second-signal.

In S1910, the ground device 1401*a* transmits a time information signal as a signal based on a sonic wave (ultrasonic wave) to the on-vehicle device 1500*a* in response to reception of the identification signal. Similarly, in S1911, the ground device 1402*a* transmits a time information signal as a signal based on a sonic wave (ultrasonic wave) to the on-vehicle device 1500*a* in response to reception of the identification signal.

Here, the time information signals respectively transmitted in S1910 and S1911 are fundamentally the same as the time information signals transmitted in S1609 in the fourth embodiment (refer to FIG. 16). In other words, the time information signal transmitted in each of s1910 and S1911 is a signal encoded to include a preparation time required for the ground device 1401*a* to transmit the time information signal from reception of the identification signal.

However, the time information signal transmitted in each of s1910 and S1911 is encoded to also include identification information for the on-vehicle device 1500*a* identifying the ground device 1400*a* which is a transmission source of the time information signal in addition to the preparation time, unlike the time information signal transmitted in S1609 in the fourth embodiment (refer to FIG. 16). The identification information included in the time information signal is taken into consideration by the on-vehicle device 1500*a* during processes in S1912 and S1913. Hereinafter, the time information signal transmitted in each of s1910 and S1911 will be referred to as a seventh second-signal in some cases so as to be clearly differentiated from the various second signals.

In S1912, the on-vehicle device 1500*a* measures a distance between each ground device 1400*a* and the on-vehicle device 1500*a* in response to reception of the time information signal. More specifically, the on-vehicle device 1500*a* measures a distance between the ground device 1400*a* and the on-vehicle device 1500*a* by taking into consideration a sonic speed based on a time obtained by subtracting the preparation time extracted from the time information signal, from a difference between a transmission timing of the identification signal and a reception timing of the time information signal. In other words, the on-vehicle device 1500*a* measures a distance between the ground device 1401*a* and the on-vehicle device 1500*a* and a distance between the ground device 1402*a* and the on-vehicle device 1500*a* based on the two time information signals including different pieces of identification.

In S1913, the on-vehicle device 1500*a* specifies a positional relationship between the ground device 1400*a* and the on-vehicle device 1500*a* based on the measurement result in S1912, and detects a position of the vehicle V based on the specified positional relationship.

As mentioned above, in the modification example illustrated in FIG. 19, even in a case where transmission and reception of the first first-signal and the first second-signal cannot be performed in the same form as in the first to third embodiments, it is realized that, instead of the ground devices 1401*a* and 1402*a* sides, the on-vehicle device 1500*a* side measures a distance between the ground device 1401*a* and the on-vehicle device 1500*a* and the ground device 1402*a* and the on-vehicle device 1500*a* based on transmission and reception results of the fifth to seventh second-signals.

Other operations in the modification example illustrated in FIG. 19 are the same as those in the fourth embodiment. In other words, in the modification example illustrated in FIG. 19, in a case where both of a signal based on light and a signal based on a sonic wave (ultrasonic wave) can be normally transmitted and received, transmission and reception of the first first-signal and the first second-signal for position detection as a normal operation can be performed in the same form as in the first to third embodiments. In the modification example illustrated in FIG. 19, in a case where neither of a signal based on light and a signal based on a sonic wave (ultrasonic wave) can be normally transmitted and received, a system abnormality signal based on a sonic wave (ultrasonic wave) may be transmitted from the ground device 1400a to the on-vehicle device 1500a.

As described above, according to the modification example illustrated in FIG. 19, transmission and reception directions of the time information signal are opposite to those in the fourth embodiment, and thus a distance between the ground device 1400a and the on-vehicle device 1500a can be easily measured by the on-vehicle device 1500a side instead of the ground device 1400a side.

Meanwhile, in the fourth embodiment (refer to FIG. 16) and the modification example (refer to FIG. 19) thereof, an example has been described in which determination of the presence or absence of abnormality of the first signal transmission unit, the first signal reception unit, and the second signal transmission/reception unit is performed based on transmission and reception of a signal between the two ground devices. However, determination of the presence or absence of abnormality of the first signal transmission unit, the first signal reception unit, and the second signal transmission/reception unit may be performed based on transmission and reception of a signal between the ground device and the on-vehicle device. In this case, as illustrated in FIG. 20, a ground device may have a configuration in which two second signal transmission/reception units, a set of first signal transmission unit and first signal reception unit, and a single processing unit are integrally provided.

Figure 20:
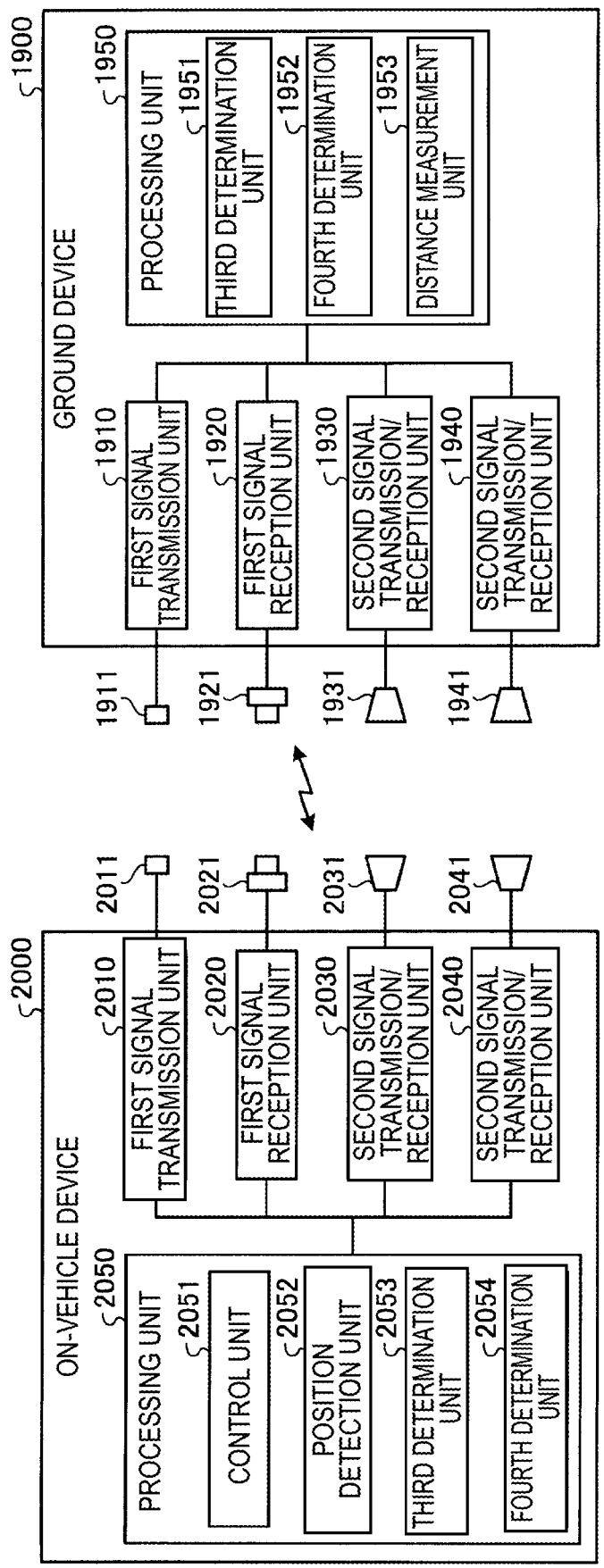
FIG. 20 is an exemplary and schematic block diagram illustrating functional configurations of a ground device and an on-vehicle device of a position detection system according to another modification example of the fourth embodiment.

FIG. 20 is an exemplary and schematic block diagram illustrating functional configurations of a ground device 1900 and an on-vehicle device 2000 of a position detection system according to another modification example of the fourth embodiment. The modification example illustrated in FIG. 20 is fundamentally the same as the fourth embodiment except that determination of the presence or absence of abnormality is performed based on transmission and reception of a signal between the ground device 1900 and the on-vehicle device 2000, and thus contents which can be understood in the same concept as that in the fourth embodiment will not be described as appropriate.

In the modification example illustrated in FIG. 20, the ground device 1900 includes a first signal transmission unit 1910, a first signal reception unit 1920, and two second signal transmission/reception units 1930 and 1940, and a processing unit 1950. The second signal transmission/reception units 1930 and 1940 are an example of a "second signal transmission unit", and are also an example of a "second signal reception unit".

The first signal transmission unit 1910 transmits a signal based on light via a light emitting unit 1911, and the first signal reception unit 1920 receives a signal based on light transmitted from the on-vehicle device 2000 via a light receiving unit 1921.

The second signal transmission/reception unit 1930 transmits and receives a signal based on a sonic wave (ultrasonic wave) to and from the on-vehicle device 2000 via a transducer 1931, and the second signal transmission/reception unit 1940 transmits and receives a signal based on a sonic wave (ultrasonic wave) to and from the on-vehicle device 2000 via a transducer 1941.

The processing unit 1950 performs various processes to be performed in the ground device 1900. The processing unit 1950 includes a third determination unit 1951, a fourth determination unit 1952, and a distance measurement unit 1953.

As will be described later in detail, the third determination unit 1951 causes the first signal transmission unit 1910 and the first signal reception unit 1920 to transmit and receive the same first determination signal as that in the fourth embodiment and a response to the first determination signal to and from the on-vehicle device 2000, so as to determine whether or not constituent elements transmitting and receiving a signal based on light in the ground device 1900 and the on-vehicle device 2000 are abnormal.

The fourth determination unit 1952 causes the second signal transmission/reception units 1930 and 1940 to transmit and receive the same second determination signal as that in the fourth embodiment and a response to the second determination signal to and from the on-vehicle device 2000, so as to determine whether or not constituent elements transmitting and receiving a signal based on a sonic wave (ultrasonic wave) in the ground device 1900 and the on-vehicle device 2000 are abnormal.

In a case where a determination result in the third determination unit 1951 indicates that a constituent element transmitting and receiving a signal based on light in at least one of the ground device 1900 and the on-vehicle device 2000 is abnormal, and a determination result in the fourth determination unit 1952 indicates that constituent elements transmitting and receiving signals based on sonic waves (ultrasonic waves) in both of the ground device 1900 and the on-vehicle device 2000 are normal, the distance measurement unit 1953 measures a distance between the ground device 1900 and the on-vehicle device 2000 in the same method as in the fourth embodiment.

On the other hand, in the modification example illustrated in FIG. 20, the on-vehicle device 2000 includes a first signal transmission unit 2010, a first signal reception unit 2020, two second signal transmission/reception units 2030 and 2040, and a processing unit 2050.

The first signal transmission unit 2010 transmits a signal based on light via a light emitting unit 2011, and the first signal reception unit 2020 receives a signal based on light transmitted from the ground device 1900 via a light receiving unit 2021.

The second signal transmission/reception unit 2030 transmits and receives a signal based on a sonic wave (ultrasonic wave) to and from the ground device 1900 via a transducer 2031, and the second signal transmission/reception unit 2040 transmits and receives a signal based on a sonic wave (ultrasonic wave) to and from the ground device 1900 via a transducer 2041.

The processing unit 2050 performs various processes to be performed in the on-vehicle device 2000. The processing unit 2050 includes a control unit 2051, a position detection unit 2052, a third determination unit 2053, and a fourth determination unit 2054.

The control unit 2051 is substantially the same as the control unit 1551 according to the fourth embodiment, and the position detection unit 2052 is substantially the same as the position detection unit 1552 according to the fourth embodiment.

The third determination unit 2053 causes the first signal transmission unit 2010 and the first signal reception unit 2020 to transmit and receive the same first determination signal as that in the fourth embodiment and a response to the first determination signal to and from the ground device 1900, so as to determine whether or not constituent elements transmitting and receiving a signal based on light in the ground device 1900 and the on-vehicle device 2000 are abnormal.

The fourth determination unit 2054 causes the second signal transmission/reception units 2030 and 2040 to transmit and receive the same second determination signal as that in the fourth embodiment and a response to the second determination signal to and from the ground device 1900, so as to determine whether or not constituent elements transmitting and receiving a signal based on a sonic wave (ultrasonic wave) in the ground device 1900 and the on-vehicle device 2000 are abnormal.

According to the modification example illustrated in FIG. 20, in the same manner as in the fourth embodiment, it is possible to determine the presence or absence of abnormality of the first signal transmission unit 1910, the first signal reception unit 1920, and the second signal transmission/reception units 1930 and 1940 of the ground device 1900, and the first signal transmission unit 2010, the first signal reception unit 2020, and the second signal transmission/reception units 2030 and 2040 of the on-vehicle device 2000 before transmission and reception of the first first-signal and the second second-signal for position detection. In a case where all of the constituent elements are normal, a position of the vehicle V can be detected in the same method as in the first to third embodiments, and, in a case where at least some of the constituent elements are abnormal, a position of the vehicle V can be detected in the same method as in the fourth embodiment.

Therefore, according to the modification example illustrated in FIG. 20, the presence or absence of the abnormality of the constituent elements transmitting and receiving a signal based on light and the constituent elements transmitting and receiving a signal based on a sonic wave (ultrasonic wave) can be checked between the ground devices 1900 and the on-vehicle device 2000, and then transmission and reception of the first first-signal and the first second-signal for position detection can be performed.

Also in the fourth embodiment, modification examples similar to the modification examples of the first to third embodiments may be supposed as appropriate. Specific contents of the modification examples of the first to third embodiments have been described, and thus a description thereof will be omitted.

The respective characteristics of the techniques according to the first to fourth embodiments (and modification examples thereof) may be combined with each other as appropriate.

A position detection system as an example of an embodiment includes a first device that is separate from a moving object, and is provided such that a position of the first device is able to be specified; and a second device that is mounted on the moving object, in which one of the first device and the second device includes a first signal transmission unit that transmits a first first-signal including a trigger to start detection of a position of the moving object, in which the other of the first device and the second device includes a first signal reception unit that receives the first first-signal, in which one of the first device and the second device includes a second signal transmission unit that transmits a first second-signal which is different from the first first-signal in response to transmission and reception of the first first-signal in the first signal transmission unit and the first signal reception unit, in which the other of the first device and the second device includes a second signal reception unit that receives the first second-signal, and in which at least one of the first device and the second device includes a position detection unit that specifies a positional relationship between the first device and the second device based on transmission and reception results of the first second-signal in the second signal transmission unit and the second signal reception unit, and detects the position of the moving object based on the positional relationship.

According to the position detection system, a positional relationship between the first device and the second device can be easily specified based on transmission and reception of the first first-signal and the first second-signal without using a satellite, and thus it is possible to recognize a position of the moving object even in an environment in which an error of positioning using a satellite is likely to become large.

In the position detection system, at least one of the second signal transmission unit and the second signal reception unit may be provided by at least two at different positions. According to this configuration, a positional relationship between the first device and the second device can be easily specified based on transmission and reception of first second-signals at two or more different positions.

In the position detection system, the position detection unit may specify the positional relationship between the first device and the second device based on a difference between a transmission timing of the first second-signal transmitted from the second signal transmission unit and a reception timing of the first second-signal received by the second signal reception unit. According to this configuration, a distance between the second signal transmission unit and the second signal reception unit can be calculated based on a difference between the transmission timing and the reception timing, and, as a result, it is possible to easily specify a positional relationship between the first device and the second device.

In the position detection system, the position detection unit may specify the positional relationship between the first device and the second device based on a reception azimuth of the first second-signal received by the second signal reception unit. According to this configuration, it is possible to easily specify a positional relationship between the first device and the second device.

In the position detection system, the first signal transmission unit and the first signal reception unit may respectively transmit and receive the first first-signal by using a first wave motion which propagates at a first velocity, and the second signal transmission unit and the second signal reception unit may respectively transmit and receive the first second-signal by using a second wave motion which propagates at a second velocity which is lower than the first velocity. According to this configuration, since a deviation between transmission and reception timings of the first first-signal is smaller than a deviation between transmission and reception timings of the first second-signal, the deviation between transmission and reception timings of the first first-signal can be prevented from influencing transmission and reception results of the first second-signals.

In the position detection system, the first wave motion may be an electromagnetic wave, and the second wave motion may be a sonic wave. According to this configuration, it is possible to appropriately use an electromagnetic wave and a sonic wave having different propagate velocities as the first wave motion and the second wave motion, respectively.

In the position detection system, the second signal transmission unit may transmit an encoded signal, as the first second-signal, assigned, through encoding, with identification information uniquely set for a device including the second signal transmission unit of the first device and the second device, and the position detection unit may specify the positional relationship between the first device and the second device based on the identification information specified from the encoded signal. According to this configuration, even in a situation in which the first second-signals are simultaneously received from a plurality of devices, the plurality of devices can be differentiated from each other, and positions thereof can be appropriately detected.

In the position detection system, as the first device, at least a first first-device and a second first-device may be provided at different positions, each of the first first-device, the second first-device, and the second device may include the first signal transmission unit, the first signal reception unit, the second signal transmission unit, and the second signal reception unit, each of the first first-device and the second first-device may further include a first determination unit that causes the first signal transmission unit and the first signal reception unit of each of the first first-device and the second first-device to try to perform transmission and reception of a second first-signal between the first first-device and the second first-device, so as to determine the presence or absence of abnormality of the first signal transmission unit and the first signal reception unit of each of the first first-device and the second first-device, and a second determination unit that causes the second signal transmission unit and the second signal reception unit of each of the first first-device and the second first-device to try to perform transmission and reception of a second second-signal between the first first-device and the second first-device, so as to determine the presence or absence of abnormality of the second signal transmission unit and the second signal reception unit of each of the first first-device and the second first-device, and, in a case where a determination result in the first determination unit indicates that both of the first signal transmission units and the first signal reception units of both of the first first-device and the second first-device are normal, and a determination result in the second determination unit indicates that both of the second signal transmission units and the second signal reception units of both of the first first-device and the second first-device are normal, the first signal transmission unit of one of the first first-device and the second device and the first signal reception unit of the other of the first first-device and the second device may perform transmission and reception of the first first-signal, and the second signal transmission unit of one of the first first-device and the second device and the second signal reception unit of the other of the first first-device and the second device may perform transmission and reception of the first second-signal, and the first signal transmission unit of one of the second first-device and the second device and the first signal reception unit of the other of the second first-device and the second device perform transmission and reception of the first first-signal, and the second signal transmission unit of one of the second first-device and the second device and the second signal reception unit of the other of the second first-device and the second device perform transmission and reception of the first second-signal.

According to this configuration, the presence or absence of the abnormality of the first signal transmission unit, the first signal reception unit, the second signal transmission unit, and the second signal reception unit can be checked between the first first-device and the second first-device, and then transmission and reception of the first first-signal and the first second-signal for position detection can be reliably performed.

In this case, in a case where a determination result in the first determination unit indicates that at least one of the first signal transmission unit and the first signal reception unit of at least one of the first first-device and the second first-device is abnormal, and a determination result in the second determination unit indicates that both of the second signal transmission units and the second signal reception units of both of the first first-device and the second first-device are normal, the second signal transmission unit of each of the first first-device and the second first-device may transmit a third second-signal to the second device, the second signal transmission unit of the second device may transmits a fourth second-signal to the first first-device and the second first-device in response to reception of the third second-signal, the first first-device may include a first distance measurement unit that measures a distance between the first first-device and the second device as a positional relationship between the first first-device and the second device based on a difference between a transmission timing of the third second-signal and a reception timing of the fourth second-signal, the second first-device may include a second distance measurement unit that measures a distance between the second first-device and the second device as a positional relationship between the second first-device and the second device based on a difference between a transmission timing of the third second-signal and a reception timing of the fourth second-signal, and the position detection unit may detect a position of the moving object based on a measurement result in the first distance measurement unit and a measurement result in the second distance measurement unit.

According to this configuration, even in a case where transmission and reception of the first first-signal cannot be performed, position detection can be performed based on transmission and reception results of the third and fourth second-signals.

In this case, the second signal transmission unit of the second device may transmit a time information signal, as the fourth second-signal, encoded to include a preparation time required to transmit the fourth second-signal from reception of the third second-signal, to the first first-device and the second first-device, the first distance measurement unit may measure a distance between the first first-device and the second device based on a time obtained by subtracting the preparation time extracted from the time information signal, from a difference between a transmission timing of the third second-signal and a reception timing of the time information signal, and the second distance measurement unit may measure a distance between the second first-device and the second device based on a time obtained by subtracting the preparation time extracted from the time information signal, from a difference between the transmission timing of the third second-signal and the reception timing of the time information signal. According to this configuration, a signal round-trip time between the first first-device (and the second first-device) and the second device can be accurately calculated by taking into consideration a preparation time, and thus it is possible to accurately measure a distance between the first first-device (and the second first-device) and the second device.

In this case, the second signal transmission unit of each of the first first-device and the second first-device may transmit, as the third second-signal, a notification signal encoded to include a notification that at least one of the first signal transmission unit and the first signal reception unit of at least one of the first first-device and the second first-device is abnormal, and an identification signal encoded to include predetermined identification information, to the second device in a stepwise manner, the second device may further include a control unit that sets the second signal reception unit to a reception mode in preparation for reception of the identification signal, in response to reception of the notification signal, and the second signal transmission unit of the second device may transmit the time information signal to the first first-device and the second first-device in response to reception of the identification signal. According to this configuration, the second signal reception unit of the second device can reliably receive the identification signal.

In the position detection system including the first determination unit and the second determination unit, and the position detection unit is provided in the second device, in a case where a determination result in the first determination unit indicates that at least one of the first signal transmission unit and the first signal reception unit of at least one of the first first-device and the second first-device is abnormal, and a determination result in the second determination unit indicates that both of the second signal transmission units and the second signal reception units of both of the first first-device and the second first-device are normal, the second signal transmission unit of each of the first first-device and the second first-device may transmit a fifth second-signal to the second device, the second signal transmission unit of the second device may transmit a sixth second-signal to the first first-device and the second first-device in response to reception of the fifth second-signal, the second signal transmission unit of each of the first first-device and the second first-device may transmit a seventh second-signal to the second device in response to reception of the sixth second-signal, and the position detection unit of the second device may measure a distance between the first first-device and the second device and a distance between the second first-device and the second device based on a difference between a transmission timing of the fifth second-signal and a reception timing of the seventh second-signal, and may detect the position of the moving object based on a measurement result.

According to this configuration, the second device side can easily measure a distance between the first first-device and the second device and a distance between the second first-device and the second device based on transmission and reception of the fifth, sixth, and seventh second-signals.

In the position detection system including the first determination unit and the second determination unit, in a case where a determination result in the first determination unit indicates that at least one of the first signal transmission unit and the first signal reception unit of at least one of the first first-device and the second first-device is abnormal, and a determination result in the second determination unit indicates that at least one of the second signal transmission unit and the second signal reception unit of each of the first first-device and the second first-device is abnormal, the second signal transmission unit of each of the first first-device and the second first-device may try to transmit an eighth second-signal to the second device, and the second device may further include a control unit that finishes trial of communication between the first first-device and the second first-device, using the first signal transmission unit, the first signal reception unit, the second signal transmission unit, and the second signal reception unit, in response to reception of the eighth second-signal.

According to this configuration, in a case where normal communication with the first first-device (and the second first-device) cannot be expected, the second device can finish execution of the communication.

In the position detection system, each of the first device and the second device may include the first signal transmission unit, the first signal reception unit, the second signal transmission unit, and the second signal reception unit, each of the first device and the second device may further include a third determination unit that causes the first signal transmission unit and the first signal reception unit of each of the first device and the second device to try to perform transmission and reception of a second first-signal between the first device and the second device, so as to determine the presence or absence of abnormality of the first signal transmission unit and the first signal reception unit of each of the first device and the second device, and a fourth determination unit that causes the second signal transmission unit and the second signal reception unit of each of the first device and the second device to try to perform transmission and reception of a second second-signal between the first device and the second device, so as to determine the presence or absence of abnormality of the second signal transmission unit and the second signal reception unit of each of the first device and the second device, and, in a case where a determination result in the third determination unit indicates that both of the first signal transmission units and the first signal reception units of both of the first device and the second device are normal, and a determination result in the fourth determination unit indicates that both of the second signal transmission units and the second signal reception units of both of the first device and the second device are normal, the first signal transmission unit of one of the first device and the second device and the first signal reception unit of the other of the first device and the second device may perform transmission and reception of the first first-signal, and the second signal transmission unit of one of the first device and the second device and the second signal reception unit of the other of the first device and the second device may perform transmission and reception of the first second-signal.

According to this configuration, the presence or absence of the abnormality of the first signal transmission unit, the first signal reception unit, the second signal transmission unit, and the second signal reception unit can be checked between the first device and the second device, and then transmission and reception of the first first-signal and the first second-signal for position detection can be reliably performed.

A processing device as another example of an embodiment, which is separate from a moving object and is provided such that a position of the processing device is able to be specified, includes a transmission unit that performs a transmission process of transmitting a predetermined first signal including a trigger to start detection of a position of the moving object; a reception unit that receives a second signal which is different from the first signal and is transmitted from the moving object; and a position detection unit that performs a position detection process of specifying a positional relationship between the processing device and the moving object based on the second signal received by the reception unit in response to reception of the first signal transmitted from the transmission unit, and detecting the position of the moving object based on the positional relationship.

According to the processing device, a positional relationship between the moving object and the processing device can be easily specified based on transmission and reception of the first signal and the second signal without using a satellite, and thus it is possible to recognize a position of the moving object even in an environment in which an error of positioning using a satellite is likely to become large, such as an indoor place or a valley of buildings.

In the processing device, in a case where an encoded signal assigned, through encoding, with identification information uniquely set for the moving object is received as the second signal by the reception unit, the position detection unit may specify the positional relationship between the processing device and the moving object based on the identification information specified from the encoded signal. According to this configuration, even in a situation in which the second signals are simultaneously received from a plurality of moving objects, the plurality of moving objects can be differentiated from each other, and positions thereof can be appropriately detected.

In the processing device, the transmission unit may transmit a detection result in the position detection unit to the moving object. According to this configuration, a (accurate) position detected by the processing device can be easily reflected in traveling control for the moving object.

In the processing device, the position detection unit may specify the positional relationship between the moving object and the processing device based on a difference between a transmission timing of the second signal transmitted from the moving object and a reception timing of the second signal received by the reception unit. According to this configuration, a distance between the moving object and the processing device can be calculated based on a difference between the transmission timing and the reception timing, and, as a result, it is possible to easily specify a positional relationship between the moving object and the processing device.

In the processing device, the position detection unit may specify the positional relationship between the moving object and the processing device based on a reception azimuth of the second signal received by the reception unit. According to this configuration, it is possible to easily specify a positional relationship between the moving object and the processing device according to the same method as triangulation.

In the processing device, the transmission unit may transmit the first signal by using a first wave motion which propagates at first velocity, and the reception unit receives the second signal by using a second wave motion which propagates at second velocity which is lower than the first velocity. According to this configuration, since a deviation between transmission and reception timings of the first signal is smaller than a deviation between transmission and reception timings of the second signal, the deviation between transmission and reception timings of the first signal can be prevented from influencing transmission and reception results of the second signals.

As mentioned above, the embodiments disclosed here have been described, but the embodiments are only examples, and are not intended to limit the scope of the embodiments disclosed here. The novel embodiments may be implemented in various forms, and may be variously omitted, replaced, and changed within the scope without departing from the concept of the embodiments disclosed here. The embodiments and the modification examples thereof are included in the scope or the concept of the embodiments disclosed here, and are also included in the embodiments disclosed in the claims and the equivalent scopes thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A position detection system comprising:
at least one processor and/or hardware circuit configured to implement:
a first device that is separate from a moving object, and is provided such that a position of the first device is able to be specified; and
a second device that is mounted on the moving object,
wherein one of the first device and the second device includes a first signal transmitter that transmits a first first-signal including a trigger to start detection of a position of the moving object,
the other of the first device and the second device includes a first signal reception unit that receives the first first-signal,
one of the first device and the second device includes a second signal transmitter that transmits a first second-signal which is different from the first first-signal in response to transmission and reception of the first first-signal in the first signal transmitter and the first signal reception unit,
the other of the first device and the second device includes a second signal reception unit that receives the first second-signal, and
at least one of the first device and the second device includes a position detection unit that specifies a positional relationship between the first device and the second device based on transmission and reception results of the first first-signal and the first second-signal in the second signal transmitter and the second signal reception unit, and detects the position of the moving object based on the positional relationship,
wherein the first signal transmitter and the first signal reception unit respectively transmit and receive the first first-signal by using a first wave motion which propagates at a first velocity, and
the second signal transmitter and the second signal reception unit respectively transmit and receive the first second-signal by using a second wave motion which propagates at a second velocity which is lower than the first velocity.

2. The position detection system according to claim 1, wherein at least one of the second signal transmitter and the second signal reception unit is provided by at least two transmitters for the second signal transmitter or two receivers for the second signal reception unit, at different positions.

3. The position detection system according to claim 1, wherein the position detection unit specifies the positional relationship between the first device and the second device based on a difference between a transmission timing of the first second-signal transmitted from the second signal transmitter and a reception timing of the first second-signal received by the second signal reception unit.

4. The position detection system according to claim 1, wherein the position detection unit specifies the positional relationship between the first device and the second device based on a reception azimuth of the first second-signal received by the second signal reception unit.

5. The position detection system according to claim 1, wherein the first wave motion is an electromagnetic wave, and
the second wave motion is a sonic wave.

6. The position detection system according to claim 1, wherein the second signal transmitter transmits an encoded signal, as the first second-signal, assigned, through encoding, with identification information uniquely set for a device including the second signal transmitter of the first device and the second device, and
the position detection unit specifies the positional relationship between the first device and the second device based on the identification information specified from the encoded signal.

7. A position detection system comprising:
at least one processor and/or hardware circuit configured to implement:
a first device that is separate from a moving object, and is provided such that a position of the first device is able to be specified; and
a second device that is mounted on the moving object,
wherein one of the first device and the second device includes a first signal transmitter that transmits a first first-signal including a trigger to start detection of a position of the moving object,
the other of the first device and the second device includes a first signal reception unit that receives the first first-signal,
one of the first device and the second device includes a second signal transmitter that transmits a first second-signal which is different from the first first-signal in response to transmission and reception of the first first-signal in the first signal transmitter and the first signal reception unit,
the other of the first device and the second device includes a second signal reception unit that receives the first second-signal, and
at least one of the first device and the second device includes a position detection unit that specifies a positional relationship between the first device and the second device based on transmission and reception results of the first first-signal and the first second-signal in the second signal transmitter and the second signal reception unit, and detects the position of the moving object based on the positional relationship,
wherein, as the first device, at least a first first-device and a second first-device are provided at different positions,
each of the first first-device, the second first-device, and the second device includes the first signal transmitter, the first signal reception unit, the second signal transmitter, and the second signal reception unit,
each of the first first-device and the second first-device further includes
a first determination unit that causes the first signal transmitter and the first signal reception unit of each of the first first-device and the second first-device to try to perform transmission and reception of a second first-signal between the first first-device and the second first-device, so as to determine the presence or absence of abnormality of the first signal transmitter and the first signal reception unit of each of the first first-device and the second first-device, and
a second determination unit that causes the second signal transmitter and the second signal reception unit of each of the first first-device and the second first-device to try to perform transmission and reception of a second second-signal between the first first-device and the second first-device, so as to determine the presence or absence of abnormality of the second signal transmitter and the second signal reception unit of each of the first first-device and the second first-device, and
in a case where a determination result in the first determination unit indicates that both of the first signal transmitters and the first signal reception units of both of the first first-device and the second first-device are normal, and a determination result in the second determination unit indicates that both of the second signal transmitters and the second signal reception units of both of the first first-device and the second first-device are normal,
the first signal transmitter of one of the first first-device and the second device and the first signal reception unit of the other of the first first-device and the second device perform transmission and reception of the first first-signal, and the second signal transmitter of one of the first first-device and the second device and the second signal reception unit of the other of the first first-device and the second device perform transmission and reception of the first second-signal, and
the first signal transmitter of one of the second first-device and the second device and the first signal reception unit of the other of the second first-device and the second device perform transmission and reception of the first first-signal, and the second signal transmitter of one of the second first-device and the second device and the second signal reception unit of the other of the second first-device and the second device perform transmission and reception of the first second-signal.

8. The position detection system according to claim 7, wherein, in a case where a determination result in the first determination unit indicates that at least one of the first signal transmitter and the first signal reception unit of at least one of the first first-device and the second first-device is abnormal, and a determination result in the second determination unit indicates that both of the second signal transmitters and the second signal reception units of both of the first first-device and the second first-device are normal,
the second signal transmitter of each of the first first-device and the second first-device transmits a third second-signal to the second device,
the second signal transmitter of the second device transmits a fourth second-signal to the first first-device and the second first-device in response to reception of the third second-signal,
the first first-device includes a first distance measurement unit that measures a distance between the first first-device and the second device as a positional relationship between the first first-device and the second device based on a difference between a transmission timing of the third second-signal and a reception timing of the fourth second-signal,
the second first-device includes a second distance measurement unit that measures a distance between the second first-device and the second device as a positional relationship between the second first-device and the second device based on a difference between a transmission timing of the third second-signal and a reception timing of the fourth second-signal, and the position detection unit detects a position of the moving object based on a measurement result in the first distance measurement unit and a measurement result in the second distance measurement unit.

9. The position detection system according to claim 8, wherein the second signal transmitter of the second device transmits a time information signal, as the fourth second-signal, encoded to include a preparation time required to transmit the fourth second-signal from reception of the third second-signal, to the first first-device and the second first-device, the first distance measurement unit measures a distance between the first first-device and the second device based on a time obtained by subtracting the preparation time extracted from the time information signal from a difference between a transmission timing of the third second-signal and a reception timing of the time information signal, and the second distance measurement unit measures a distance between the second first-device and the second device based on a time obtained by subtracting the preparation time extracted from the time information signal, from a difference between the transmission timing of the third second-signal and the reception timing of the time information signal.

10. The position detection system according to claim 9, wherein the second signal transmitter of each of the first first-device and the second first-device transmits, as the third second-signal, a notification signal encoded to include a notification that at least one of the first signal transmitter and the first signal reception unit of at least one of the first first-device and the second first-device is abnormal, and an identification signal encoded to include predetermined identification information, to the second device in a stepwise manner, the second device further includes a control unit that sets the second signal reception unit to a reception mode in preparation for reception of the identification signal, in response to reception of the notification signal, and the second signal transmitter of the second device transmits the time information signal to the first first-device and the second first-device in response to reception of the identification signal.

11. The position detection system according to claim 7, wherein the position detection unit is provided in the second device, and in a case where a determination result in the first determination unit indicates that at least one of the first signal transmitter and the first signal reception unit of at least one of the first first-device and the second first-device is abnormal, and a determination result in the second determination unit indicates that both of the second signal transmitters and the second signal reception units of both of the first first-device and the second first-device are normal, the second signal transmitter of each of the first first-device and the second first-device transmits a fifth second-signal to the second device, the second signal transmitter of the second device transmits a sixth second-signal to the first first-device and the second first-device in response to reception of the fifth second-signal, the second signal transmitter of each of the first first-device and the second first-device transmits a seventh second-signal to the second device in response to reception of the sixth second-signal, and the position detection unit of the second device measures a distance between the first first-device and the second device and a distance between the second first-device and the second device based on a difference between a transmission timing of the fifth second-signal and a reception timing of the seventh second-signal, and detects the position of the moving object based on a measurement result.

12. The position detection system according to claim 7, wherein, in a case where a determination result in the first determination unit indicates that at least one of the first signal transmitter and the first signal reception unit of at least one of the first first-device and the second first-device is abnormal, and a determination result in the second determination unit indicates that at least one of the second signal transmitter and the second signal reception unit of each of the first first-device and the second first-device is abnormal, the second signal transmitter of each of the first first-device and the second first-device tries to transmit an eighth second-signal to the second device, and the second device further includes a control unit that finishes trial of communication between the first first-device and the second first-device, using the first signal transmitter, the first signal reception unit, the second signal transmitter, and the second signal reception unit, in response to reception of the eighth second-signal.

13. The position detection system according to claim 1, wherein each of the first device and the second device includes the first signal transmitter, the first signal reception unit, the second signal transmitter, and the second signal reception unit, each of the first device and the second device further includes a third determination unit that causes the first signal transmitter and the first signal reception unit of each of the first device and the second device to try to perform transmission and reception of a second first-signal between the first device and the second device, so as to determine the presence or absence of abnormality of the first signal transmitter and the first signal reception unit of each of the first device and the second device, and a fourth determination unit that causes the second signal transmitter and the second signal reception unit of each of the first device and the second device to try to perform transmission and reception of a second second-signal between the first device and the second device, so as to determine the presence or absence of abnormality of the second signal transmitter and the second signal reception unit of each of the first device and the second device, and in a case where a determination result in the third determination unit indicates that both of the first signal transmitters and the first signal reception units of both of the first device and the second device are normal, and a determination result in the fourth determination unit indicates that both of the second signal transmitters and the second signal reception units of both of the first device and the second device are normal, the first signal transmitter of one of the first device and the second device and the first signal reception unit of the other of the first device and the second device perform transmission and reception of the first first-signal, and the second signal transmitter of one of the first device and the second device and the second signal reception unit of the other of the first device and the second device perform transmission and reception of the first second-signal.

14. A processing device which is separate from a moving object and is provided such that a position of the processing device is able to be specified, comprising:
   at least one processor and/or hardware circuit configured to implement:
   a transmitter that performs a transmission process of transmitting a predetermined first signal including a trigger to start detection of a position of the moving object;
   a reception unit that receives a second signal which is different from the first signal and is transmitted from the moving object; and
   a position detection unit that performs a position detection process of specifying a positional relationship between the processing device and the moving object based on transmission and reception results of the first signal and the second signal received by the reception unit in response to reception of the first signal transmitted from the transmitter, and detecting the position of the moving object based on the positional relationship,
   wherein the transmitter transmits the first signal by using a first wave motion which propagates at first velocity, and the reception unit receives the second signal by using a second wave motion which propagates at second velocity which is lower than the first velocity.

15. The processing device according to claim 14,
   wherein, in a case where an encoded signal assigned, through encoding, with identification information uniquely set for the moving object is received as the second signal by the reception unit, the position detection unit specifies the positional relationship between the processing device and the moving object based on the identification information specified from the encoded signal.

16. The processing device according to claim 14,
   wherein the transmitter transmits a detection result in the position detection unit to the moving object.

17. The processing device according to claim 14,
   wherein the position detection unit specifies the positional relationship between the moving object and the processing device based on a difference between a transmission timing of the second signal transmitted from the moving object and a reception timing of the second signal received by the reception unit.

18. The processing device according to claim 14,
   wherein the position detection unit specifies the positional relationship between the moving object and the processing device based on a reception azimuth of the second signal received by the reception unit.

* * * * *